US009322949B2

(12) United States Patent
Mosse et al.

(10) Patent No.: US 9,322,949 B2
(45) Date of Patent: Apr. 26, 2016

(54) SYSTEM AND METHOD FOR GENERATING DENSITY IN A CASED-HOLE WELLBORE

(75) Inventors: Laurent Mosse, Montrouge (FR); James Hemingway, Houston, TX (US); Ronald Plasek, Houston, TX (US); Nancy J. Freshman, legal representative, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 471 days.

(21) Appl. No.: 13/089,159

(22) Filed: Apr. 18, 2011

(65) Prior Publication Data
US 2011/0253364 A1 Oct. 20, 2011

Related U.S. Application Data

(60) Provisional application No. 61/325,444, filed on Apr. 19, 2010.

(51) Int. Cl.
*G01V 5/12* (2006.01)
*G01V 13/00* (2006.01)
*E21B 47/08* (2012.01)
*E21B 47/09* (2012.01)
*E21B 49/00* (2006.01)
*G01V 1/44* (2006.01)

(52) U.S. Cl.
CPC ............... *G01V 5/125* (2013.01); *E21B 47/08* (2013.01); *E21B 47/09* (2013.01); *E21B 49/005* (2013.01); *G01V 1/44* (2013.01); *G01V 13/00* (2013.01)

(58) Field of Classification Search
USPC ........................................ 250/269.1
See application file for complete search history.

(56) References Cited

U.S. PATENT DOCUMENTS

| 4,129,777 | A  | 12/1978 | Wahl et al. |
| 4,297,575 | A  | 10/1981 | Smith, Jr. et al. |
| 5,525,797 | A  | 6/1996  | Moake |
| 7,215,125 | B2 | 5/2007  | Clark |

(Continued)

FOREIGN PATENT DOCUMENTS

| EP | 0864884 | 9/1998 |
| GB | 2388188 | 11/2003 |

OTHER PUBLICATIONS

P.A.S. Elkington, et al., "A novel cased hole density-neutron log-characteristics and interpretation", Thriving on Volatility, Asia Pacific Oil & Gas Conference and Exhibition 2006, Sep. 11-13, 2006, Adelaide, Australia, Richardson, Tex., Soc. of Petroleum Engineers, US. vol. 1, 11, pp. 546-552.

(Continued)

*Primary Examiner* — David Porta
*Assistant Examiner* — Shun Lee

(57) ABSTRACT

The invention relates to techniques, such as a system for generating a density of a cased wellbore. The system includes at least one downhole tool deployable into the cased wellbore, a radiation source supportable by the downhole tool for passing radiation through the subterranean formation, at least one detector supportable by the downhole tool for measuring the radiation, and a measurement tool for generating at least one apparent density log from the measured radiation. The measurement tool has at least one quality indicator tool for generating at least one quality indicator and for generating at least one compensated density log based on the apparent density log and the quality indicator whereby error is removed therefrom.

10 Claims, 19 Drawing Sheets

(56) References Cited

U.S. PATENT DOCUMENTS

| | | | |
|---|---|---|---|
| 7,215,215 B2 | 5/2007 | Clark | |
| 7,292,942 B2 | 11/2007 | Ellis et al. | |
| 7,522,471 B2 | 4/2009 | Froelich et al. | |
| 7,755,032 B2 | 7/2010 | Poe et al. | |
| 7,902,496 B2 | 3/2011 | Botto et al. | |
| 2004/0010373 A1* | 1/2004 | Smits et al. | 702/6 |
| 2004/0210393 A1* | 10/2004 | Ellis et al. | 702/8 |
| 2004/0256101 A1* | 12/2004 | Fox et al. | 166/252.5 |
| 2011/0056681 A1 | 3/2011 | Khan | |

OTHER PUBLICATIONS

International Search Report and Written Opinion from the equivalent patent application of PCT/US2011/032927 issued on Feb. 13, 2012.
H. Sherman and S. Locke, "Depth of Investigation of Neutron and Density Sondes for 35-Percent-Porosity Sand," SPWLA Sixteenth Annual Logging Symposium, June 4.7, 1975, pp. 1-14.
G.L. Moake, "Design of a Cased-Hole-Density Logging Tool Using Laboratory Measurements", SPE Annual Technical Conference and Exhibition, Sep. 27-30, 1998, New Orleans, Louisiana, pp. 565-580.
L.L. Raymer, R.L. Morris, "A Logging Program for Cased-Hole Recompletion," SPWLA 5th Annual Logging Symposium, 1964, pp. 1-14.
J.S. Wahl, J. Tittman, C.W. Johnstone, "The Dual Spacing Formation Density Log," Journal of Petroleum Technology, Dec. 1964, pp. 1411-1416.
C.H. Neuman, M.J. Sullivan, D.L. Belanger, "An Investigation of density Derived from Pused Neutron Capture Measurements", SPE Annual Technical Conference and Exhibition, Oct. 3-6, 1999, Houston, Texas, pp. 1-8.
D. Ellis, M.G. Luling, M.E. Markley, L. Mosse, S. Neumann, G. Pilot, I. Stowe, "Cased-Hole Formation-Density Logging—Some Field Experiences", SPWLA 45th Annual Logging Symposium, Jun. 6-9, 2004 pp. 1-14.
L.A. Jacobson, C-C. Fu, "Computer Simulation OF Cased-Hole Density Logging", Society of Petroleum Engineers, SPE Formation Evaluation, vol. 5, No. 4, Dec. 1990, pp. 465-468.
I. Albertin, I. Cedeno, J. Hemingway, M. Markley, J-R. Olesen, B. Roscoe, W. Zeng, "The Many Facets of Pused Neutron Cased-Hole Logging", Oilfield Review, Summer 1996, pp. 28-41.

\* cited by examiner

SYSTEM AND METHOD FOR GENERATING DENSITY IN A CASED-HOLE WELLBORE

CROSS-REFERENCE TO RELATED APPLICATION

This application claims priority from U.S. Provisional Patent Application Ser. No. 61/325,444 filed on Apr. 19, 2010, the entire contents of which is hereby incorporated by reference.

BACKGROUND OF THE DISCLOSURE

1. Field of the Invention

The present disclosure relates to techniques for determining parameters of a wellsite. More particularly, the present disclosure relates to determining formation parameters, such as density, behind casing.

2. Background

Oil rigs may be positioned at wellsites for drilling a wellbore, performing downhole testing and producing located hydrocarbons. Downhole drilling tools may be advanced into the earth from a surface rig to form the wellbore. During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, a casing may be positioned into the wellbore and cemented in place to line the well. Production equipment may also be positioned in the wellbore to assist in drawing the hydrocarbons from a subsurface reservoir to the surface.

In some cases, it may be necessary to take downhole measurements after the casing is installed in the wellbore. There may be reasons for making traditional 'open hole' measurements, such as those taken by the drilling and/or wireline tools, after casing has been set. Some of the reasons for taking these 'cased hole' measurements may include, for example, difficult logging conditions, highly deviated wells where deployment is a problem, or simply avoiding expensive rig time. The introduction of pulsed neutron capture measurements nearly 50 years ago provided some of the first opportunities to do formation evaluation in cased wellbores.

Over the years new techniques have been developed for taking downhole measurements as described, for example, in U.S. Pat. Nos. 7,215,125, 7,292,942, 7,522,471, 7,755,032, 7,902,496, and 20110056681. Some of these techniques may involve taking downhole measurements, such as density, in cased wellbores as described, for example, in U.S. Pat. No. 7,292,942.

Some 'open hole' measurements, such as gamma ray, neutron porosity, capture spectroscopy and/or natural gamma ray spectroscopy measurements, may be fairly adaptable to the cased hole environment, in some cases with minimal modifications. Some open hole acoustic logging techniques, such as full waveform sonic logs, slowness time coherence processing and resistivity logs, have been attempted in cased wells. Various techniques for identifying or quantifying gas using neutron or pulsed neutron tools have also been attempted, but may not be as robust as the standard neutron density crossover effect typically seen in open hole applications. Modifications to algorithms and/or measurement procedures (e.g., slower logging speeds) may be needed to adapt some 'open hole' measurements to cased hole applications.

In some cases, certain 'open hole' measurements may not be readily adaptable to cased hole applications. Certain cased hole measurements, such as density, spontaneous potential (SP), image logging and magnetic resonance, may be more difficult to make, may be more sensitive to the cased environment, may not be equivalent to corresponding 'open hole' measurements, and/or may not be possible in a cased hole environment (e.g. where a measurement device cannot measure through metal devices, such as casing). For example, density measurements in cased wellbores may be limited by the shallow depth of investigation of available gamma-gamma density tools and/or by environmental sensitivity. Achieving deeper readings may be limited by the physics of the measurement.

Despite the advancement of 'cased hole' measurements, there remains a need for providing accurate measurement of a wide variety of downhole parameters, such as density, in a cased wellbore. The invention is directed at providing this need.

SUMMARY OF THE INVENTION

In at least one aspect, the invention relates to a system for generating a density measurement in a cased wellbore, the cased wellbore penetrating a subterranean formation. The system includes at least one downhole tool deployable into the cased wellbore, a radiation source supportable by the downhole tool for passing radiation through the subterranean formation, at least one detector supportable by the downhole tool for measuring the radiation, and a measurement tool for generating at least one apparent density log from the measured radiation. The measurement tool includes at least one quality indicator tool for generating at least one quality indicator and for generating at least one compensated density log based on the apparent density log and the quality indicator whereby error is removed therefrom.

The quality indicator tool may include a cement quantifier, a casing quantifier, an error filter, and a casing collar detector. The detector may be a backscatter detector, a long spaced detector, and/or a short spaced detector. The system may also include a collar locator, and/or a caliper. The downhole tool may be one of a wireline tool, a drilling tool, a coiled tubing tool, ultrasonic tool and/or a completions tool.

In another aspect, the invention relates to a method of generating a density measurement about a cased wellbore, the cased wellbore penetrating a subterranean formation. The method involves positioning at least one downhole tool into the cased wellbore, passing radiation from the at least one downhole tool through the casing and into the subterranean formation, measuring the radiation with at least one detector of the at least one downhole tool, and generating an energy spectrum from the measured radiation. The method may further involve generating at least one apparent density log based on the generated energy spectrum, determining at least one quality indicator, and generating a compensated density log based on the apparent density log and the quality indicator.

The step of determining the quality indicator may involve determining a casing thickness, and the step of generating a compensated density log may involve generating a compensated density log based on the apparent density log and the casing thickness. The casing thickness may be determined by reviewing known casing data, evaluating casing measurements taken by at least one detector, and selectively removing at least one casing measurement from the casing measurements.

The step of determining the quality indicator may also involve detecting casing collars, and the step of generating a compensated density log may involve generating a compensated density log based on the apparent density log and the detected casing collars. The casing collars may be detected by identifying casing spikes on the apparent density log, removing data corresponding to the identified casing spikes, and interpolating remaining data adjacent the removed data.

The method may also involve validating the compensated density log with the at least one quality indicator. The step of determining the quality indicator may involve determining a cement thickness, and the step of validating may involve validating the compensated density log with the cement thickness. Determining the cement thickness may involve determining a photoelectric effect and/or determining an apparent density. The step of determining may also involve determining an estimated error, and the step of validating may involve validating the compensated density log with the estimated error. The estimated error may be based on casing error, cement error, and/or logging speed.

The method may also involve generating at least one photoelectric (or other) log based on at least one of the quality indicators.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

The description that follows includes exemplary apparatus, methods, techniques, and instruction sequences that embody techniques of the present inventive subject matter. However, it is understood that the described embodiments may be practiced without these specific details. Presently preferred embodiments of the disclosure are shown in the above-identified Figures and described in detail below.

The invention provides techniques for making cased hole measurements of parameters, such as density (Cased Hole Formation Density or CHFD). Due to the potential effects of casing (and casing collars), cement, and/or error on cased hole measurements, techniques have been provided to validate, enhance and/or refine the cased hole measurements. Such techniques may involve, for example, providing indicators of measurement reliability, correcting for cased hole effects, detecting potential error, eliminating causes of error and/or selectively including data. Such techniques may also involve identifying a valid formation density response to determine whether the cased hole measurements are representative of the formation, casing, cement or other cased hole components. These techniques may be used for cased hole measurements, such as density and/or other gamma-gamma density tool models (e.g., gas saturation, low porosity formations, etc.).

Figure 1:
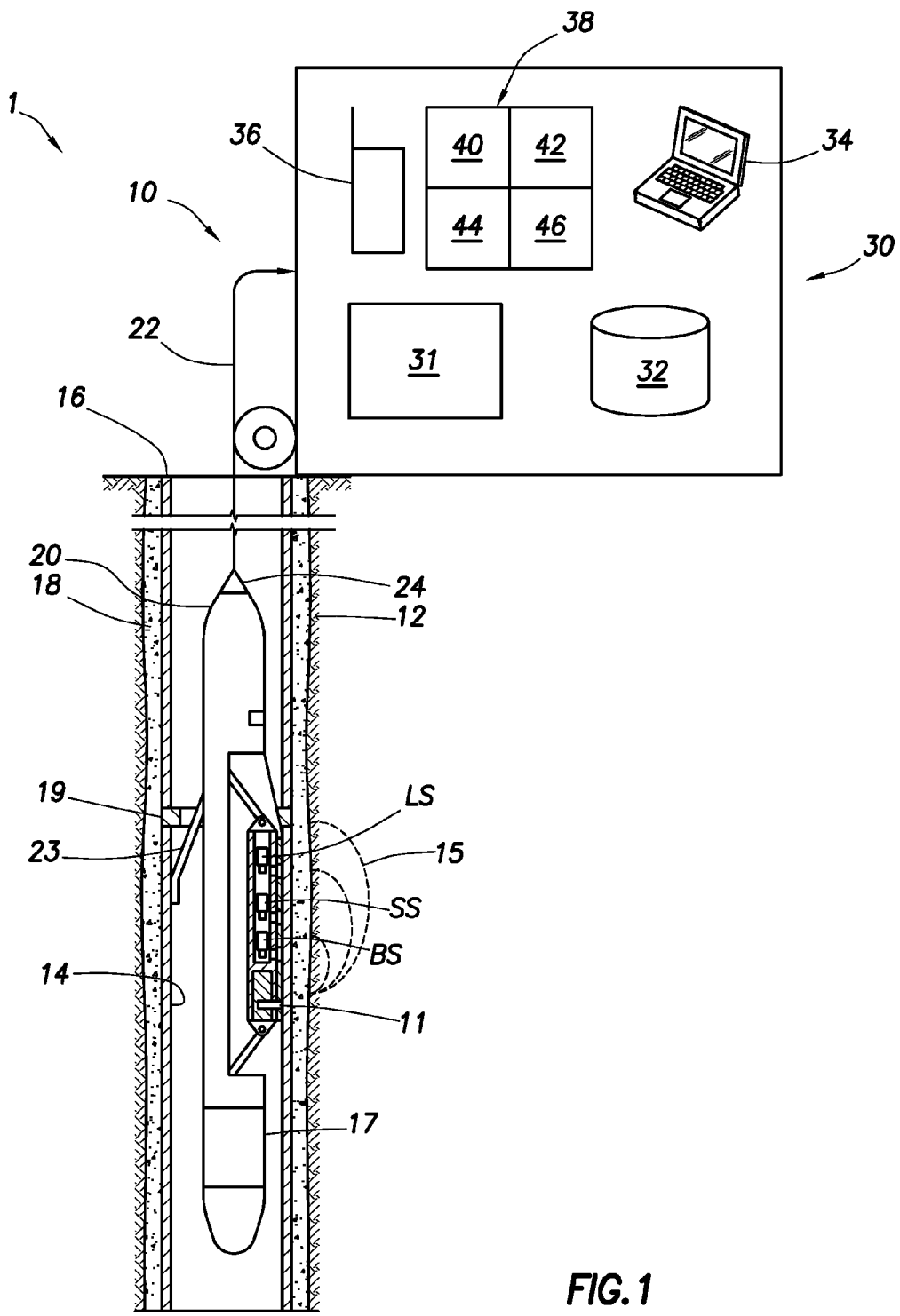
FIG. 1 is a schematic view of a wellsite having a system for generating downhole parameters, such as a density measurement, in a cased wellbore.

FIG. 1 shows a wellsite 1 having a system 10 for generating a downhole parameter of a wellbore 14 extending into a subterranean formation 12. The system 10 may be a conventional system used for generating a downhole parameter in an open hole wellbore (without casing), or a cased wellbore. An example of a conventional system usable as the system 10 is described in U.S. Pat. No. 7,292,942, the entire contents of which are hereby incorporated by reference. As shown in FIG. 1, the wellbore 14 has been drilled within the subsurface formation 12, and a casing 16 has been cemented into place in the wellbore 14 by a cement 18. One or more casing collars 19 may be located along the casing 16.

The system 10 includes a logging (or downhole) tool 20 that is suspended in the wellbore 14 on a cable 22, the deployed length of which may substantially determine a depth of the downhole tools within the subsurface formation 12. A swivel 24 is provided to allow the downhole tool 20 to rotate with respect to the cable 22. The cable length may be controlled by conventional means at the surface (not shown).

The downhole tool 20 may be a conventional logging tool provided with various sensors, such as a gamma ray sensor 11, and/or detectors, such as a short spacing detector SS, a long spacing detector LS, and a backscatter detector BS, for measuring downhole parameters. An additional detector, such as a caliper 23, may be provided for measuring various parameters. The caliper 23 as shown is an arm extending from the downhole tool 20 for pushing the downhole tool 20 against the casing 16 and measuring the dimensions thereof. The gamma ray sensor 11 may have a gamma source for emitting radiation into the formation 12 as indicated by the waves 15. The gamma ray sensor 11 and detectors SS, LS, BS may be used to measure the radiation that returns from the formation 12. Additional tools and devices, such as electronics 17, may also be provided in the downhole tool 20 to support downhole operations. The downhole tool 20 may optionally be removed so that another tool, such as an ultrasonic tool, may be deployed to take additional measurements.

The system 10 also includes a surface unit 30 to process, compute, and record measurements made by the downhole tool 20. The surface unit 30 includes a processor 31, a database 32, a display 34, a transceiver 36, and a measurement quality tool 38. The surface unit 30 is in communication with the downhole tool 20 via the cable 22 and/or transceiver 36. Data collected by the downhole tool 20 may be received by the processor 31, stored in the database 32 and displayed on display 34. The data may then be analyzed by the measurement quality tool 38. The gamma rays measured by the sensors and/or detectors may be used by the measurement quality tool 38 to generate energy spectrums. The transceiver 36 may be in communication with other on or offsite components and/or facilities (not shown) via the transceiver or other appropriate communication device.

Aspects of the cased hole environment, such as the casing 16, casing collars 19, and/or cement 18, may affect measurements taken by the downhole tool 20. In particular, at least some measurements taken by the downhole tool 20 under certain environmental conditions, such as a large casing offset, may generate inaccurate data. The measurement quality tool 38 may be used to generate density logs, and/or to analyze, filter, adjust and/or otherwise process the data received from the downhole tool 20.

The measurement tool 38 is depicted as including quality indicator tools, namely a cement quantifier 40, a casing quantifier 42, an error filter 44, and a casing collar detector 46. The cement quantifier 40 may be used to determine cement thickness. The casing quantifier 42 may be used to detect and correct for casing thickness. The error filter 44 may be used to adjust for error in the measurements. The casing detector 46 (and/or caliper 23) may be used to detect casing collars, if present, and adjust for their effect on the downhole measurements. The measurement tool 38 may then generate a compensated density log based on data from the quality indicator tools, as will be described in further detail herein.

Figure 2:
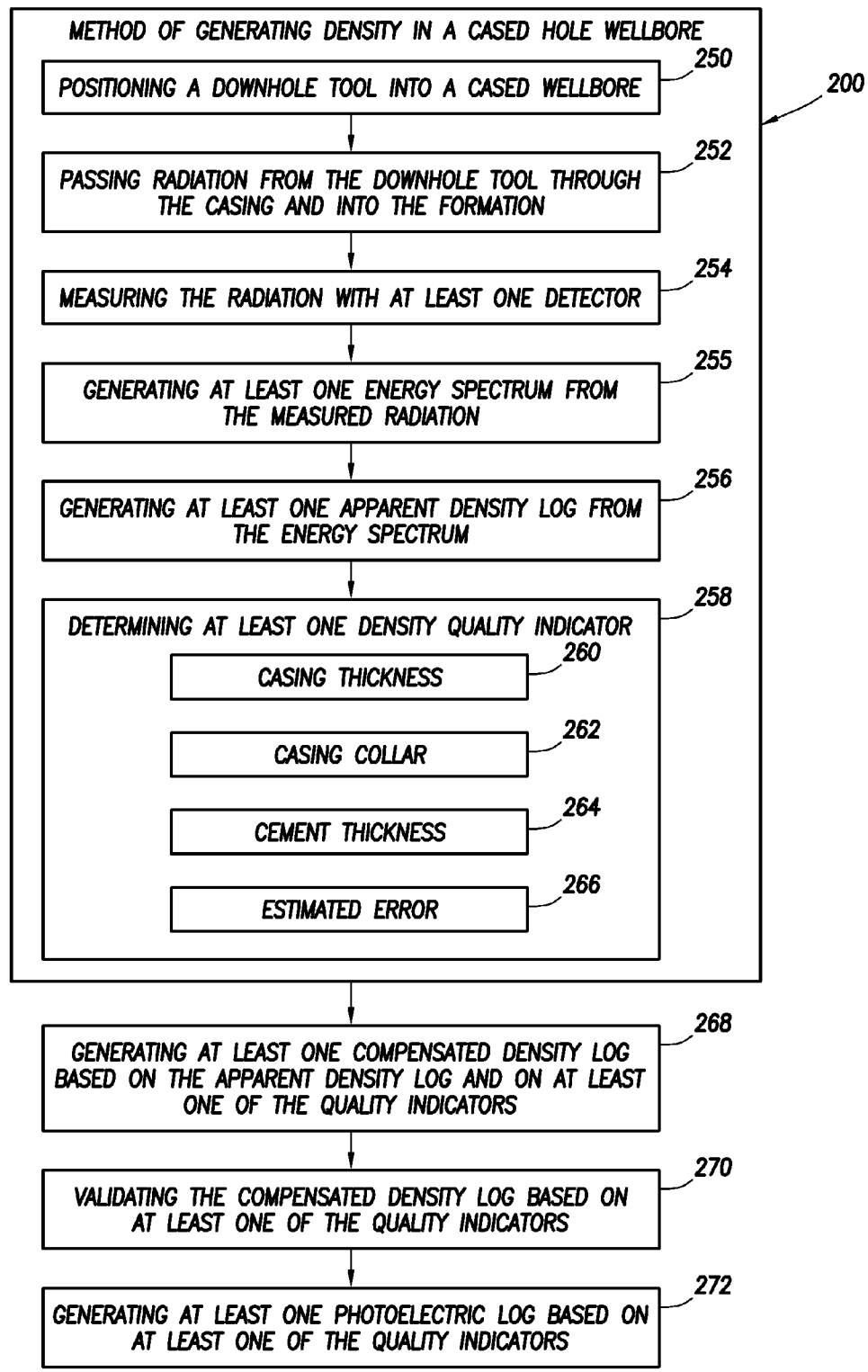
FIG. 2 is a flow chart depicting a method of generating downhole parameters, such as a density measurement, in a cased wellbore.

FIG. 2 shows a method 200 of generating downhole parameters, such as density, in a cased-hole wellbore using, for example, the system 10 as shown in FIG. 1. The method (200) involves positioning (250) at least one downhole tool (e.g., downhole tool 20) into a cased wellbore, passing (252) radiation from the downhole tool through the casing and into the formation, and measuring (254) the radiation with at least one detector of the downhole tool.

The method may further involve generating (255) at least one energy spectrum from the measured radiation, and generating (256) at least one apparent density log from the energy spectrum. The steps of generating (255), (266) may be performed using conventional techniques as described in U.S. Pat. No. 7,292,942, previously incorporated herein, and using, for example, the surface unit 30 of FIG. 1. The conventional density methodology may use a so-called 'spine and ribs' technique. A single-detector density response may be determined from the following Equation (1):

$$\ln(W) = (\mu + v \cdot Pe_f)\rho_f + L \qquad \text{Equation (1)}$$

where W is the count-rate in a specified gamma-ray detector energy window, $\mu$ and $v$ are related to a Compton scattering and photoelectric absorption cross-sections, respectively, $Pe_f$ is the formation photoelectric factor, $\rho_f$ is the formation density, and L is a constant.

When intervening mud cake (or casing, or cement) causes a standoff between the tool and the formation, Equation (1) may no longer measure the true formation density, but rather a so-called 'apparent' density. The standoff sensitivity can be modeled through a response function F(h) which, to first order may depend only on the standoff thickness h:

$$\rho_{ap} = \rho_f - F(h) \cdot (\rho_f - \rho_{so}) \qquad \text{Equation (2)}$$

where $\rho_{ap}$ is the apparent density, $\rho_f$ is the true formation density, $\rho_{so}$ is the density of the standoff material, and F(h) is a function varying from 0 to 1 (often non-linearly). When F(h)=1, the corresponding detector energy window is said to be saturated, and this value of h is known as its saturation length ($L_{sat}$) as described further below. There may be different F's and $L_{sat}$'s for mudcake, casing, cement, and other possible standoff materials.

In cases where two detectors are at different spacing from the radiation source to the detector, such as the 'long-spaced' (LS) and the 'short-spaced' (SS) detectors of FIG. 1, an estimate of formation density can be obtained through the following spine and ribs equation:

$$\rho_f = \rho_{LS} + \frac{F_{LS}(h)}{F_{SS}(h) - F_{LS}(h)}(\rho_{LS} - \rho_{ss}) \qquad \text{Equation (3)}$$

where the $F_{LS}$ and $F_{SS}$ are the detector-dependent standoff response functions and $\rho_{LS}$ and $\rho_{SS}$ are the single-detector apparent densities. The 'classic' rib correction above relies on the fact that F(h) may be almost linear when h is small, so that the ratio $F_{LS}(h)/(F_{SS}(h)-F_{LS}(h))$ is virtually constant.

In some cases, the spine and ribs methodology may be valid as long as the standoff material is not "too thick" (i.e., less than some limit $h_{max}$). This limit may be determined primarily by source-to-detector spacing and other tool-specific geometry. In some cases, thick cement may affect the density measurement as shown dramatically in FIG. 16 (described further herein). Thus, it may be critically important to be able to measure standoff thickness depth-by-depth in order to know when the spine and ribs methodology of density calculation is valid.

Figure 3:
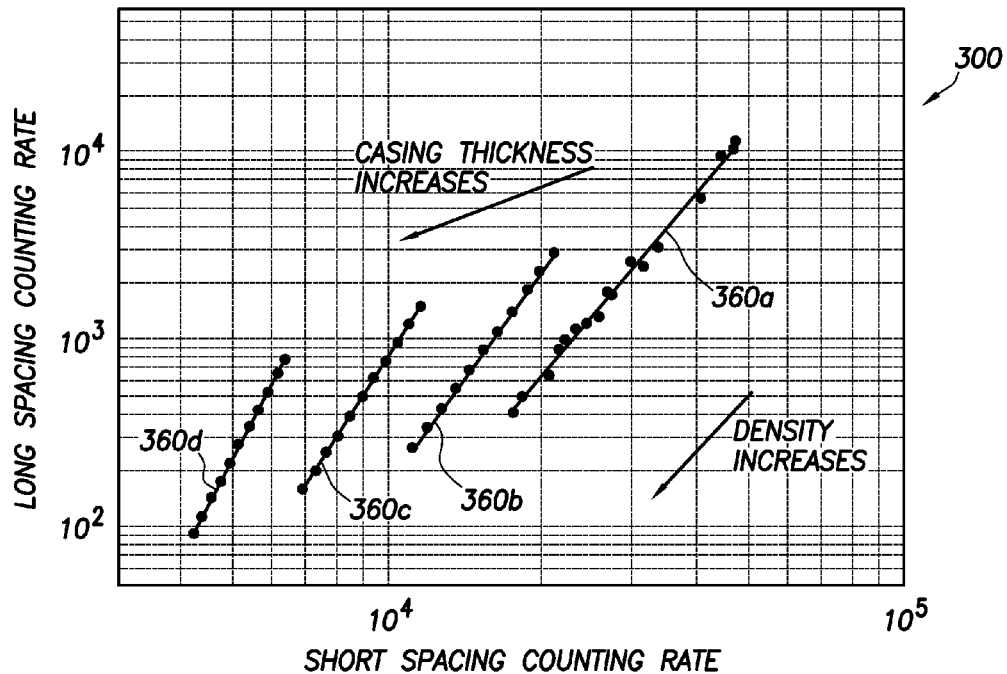
FIG. 3 is a graph depicting the effect of casing thickness on density response.
Figure 11:
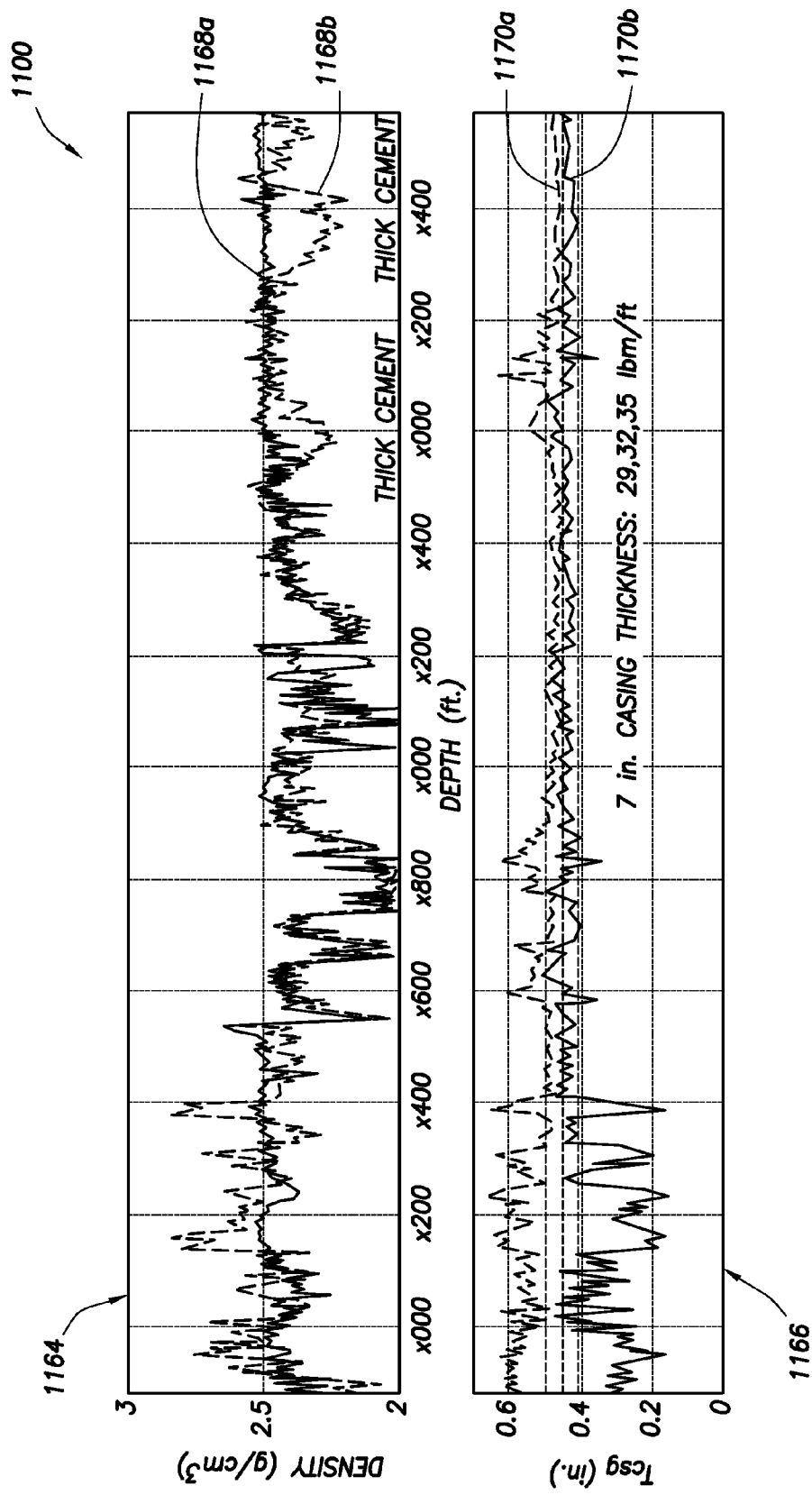
FIG. 11 is a log depicting possible effect of scale.
Figure 16:
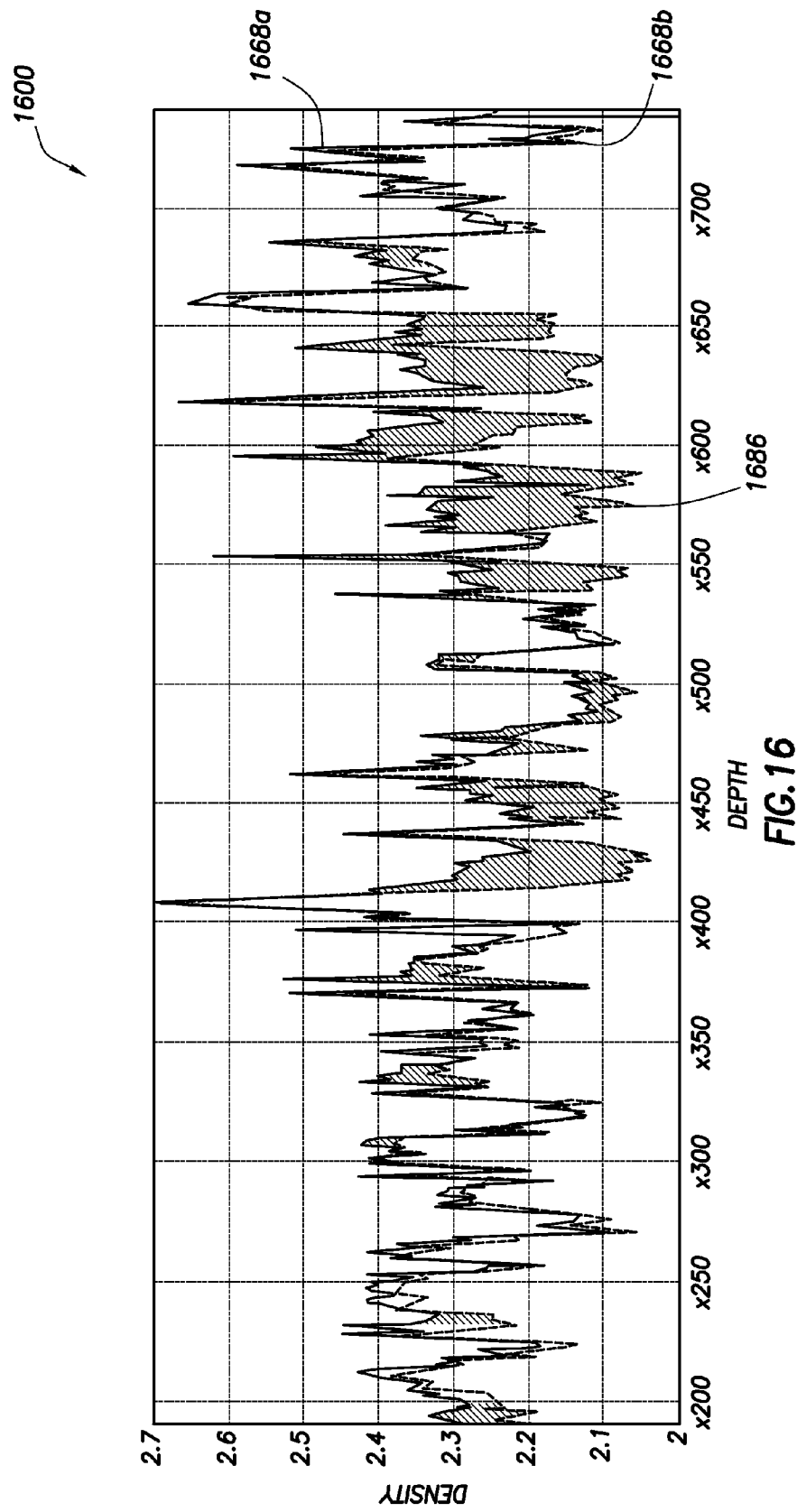
FIG. 16 is a log depicting the effect of thick cement.
Figure 20:
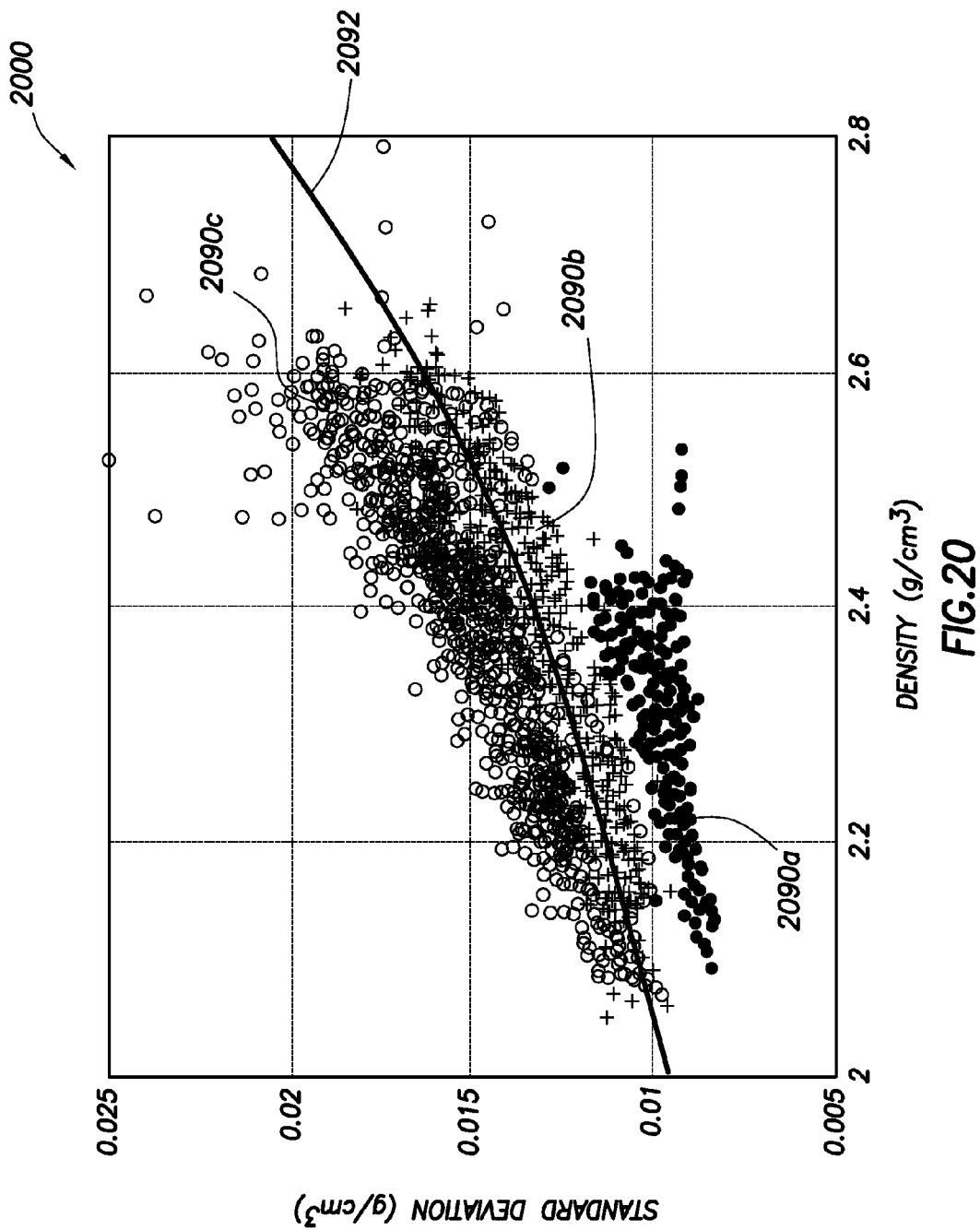
FIG. 20 is a graph depicting precision versus density.

Various factors, such as casing thickness (as depicted in FIG. 3), scale (as depicted in FIG. 11), thick cement (as depicted in FIG. 16) and estimated (or measurement) error (as depicted in FIG. 20), may cause error in the density measurements in cased hole applications as will be described in further detail herein. To address this potential error caused by various factors, the method may further involve determining (258) at least one quality indicator, generating (268) at least one compensated density log based on the apparent density and at least one of the quality indicators using, for example, the measurement quality tool 38 of FIG. 1. The method (200) may also involve validating (270) the compensated density log based on at least one of the quality indicators and generating (272) at least one photoelectric log based on at least one of the quality indicators. One or more quality indicators, such as casing thickness (260), casing collars (262), cement thickness (264) and/or estimated error (266), that may affect the density measurement determined by the measurement quality tool 38 may be determined.

Casing Thickness

The presence of casing in the wellbore may affect the downhole measurements. For example, the casing 16 may affect the passage of radiation from the source of the downhole tool 20 and into the formation 12 as shown in FIG. 1, thereby affecting the measurements taken by the detectors (e.g., LS, SS, BS). The casing may be discernable on density logs. Unlike open-hole density, there may be a different density response (e.g., spine slope) for every casing thickness value (i.e., each casing size and weight combination). Therefore, the casing thickness may be used to quantify the effect of the casing on the density measurement.

In most wells, certain casing dimensions are available for a given wellsite. The casing thickness may be, for example, supplied by a wellsite owner/operator, through the parameters of the casing size and casing weight (casing mass per unit of length, in lbm/ft). The computation of casing thickness may be taken from the following equation:

$$\lambda = 1/2\left(CSIZ - \sqrt{CSIZ^2 - \frac{CWEI}{2.72}}\right) \quad \text{Equation (4)}$$

where $\lambda$ is the casing thickness, CSIZ is the casing size, and CWEI is the casing weight. Equation (4) may use, for example, an inherent steel density of 7.98 g/cm$^3$ may be used to generate the 2.72 constant. In other cases, a suitable material, such as stainless steel, may be used and the constant adjusted.

However, the reported casing weight value may be incorrect or inaccurate. Sometimes joints of different casing weights are used, seemingly mixed at random. Use of an incorrect casing thickness may cause errors in the density, as well as cement thickness estimates. Additionally, in open-hole density logging, the downhole tool may have a single LS versus SS count-rate response (only one "spine"). In contrast, the downhole tool 20 of FIG. 1 may have a different spine for every different casing thickness (one spine for every different casing size and casing weight combination).

FIG. 3 is a graph 300 showing the effect of casing alone on the density measurement. The graph 300 depicts long spacing (LS) counting rate (y-axis) versus short spacing (SS) counting rate (x-axis) for casing of various thicknesses. As shown, counting rates 360a-d were provided for 0.00 in. (0.00 mm) (open-hole), 0.20 in. (5.08 mm), 0.40 in. (10.16 mm) and 0.60 in. (15.24 mm) casing thicknesses, respectively. As demonstrated by this graph, casing may substantially reduce the formation count-rate. More importantly, casing thickness may also change both the LS and SS count-rate responses (spine slopes). Thus, if the casing thickness input is wrongly selected, the calculated LS and SS apparent densities, compensated formation density and cement thickness may also be incorrect.

The casing thickness may be determined by comparing density measurements taken by various tools, such as the detectors and caliper 23 of FIG. 1, and by considering known information about the casing. To address potential errors caused by casing thickness, independent casing thickness measurements may be performed using various detectors, such as the LS, SS and BS detectors, a caliper 23 (FIG. 1), and/or an ultrasonic device, to determine a casing thickness. In some cases, casing thickness is not always recorded together with the density log, and may not be available for density analysis. A stand-alone, density-based casing thickness estimate may be derived from the very short-spaced "backscatter" detector count-rates, such as the BS of FIG. 1. As such, incorrect casing weight parameters may be detected, correct thickness values provided, and resulting errors avoided.

Figure 4:
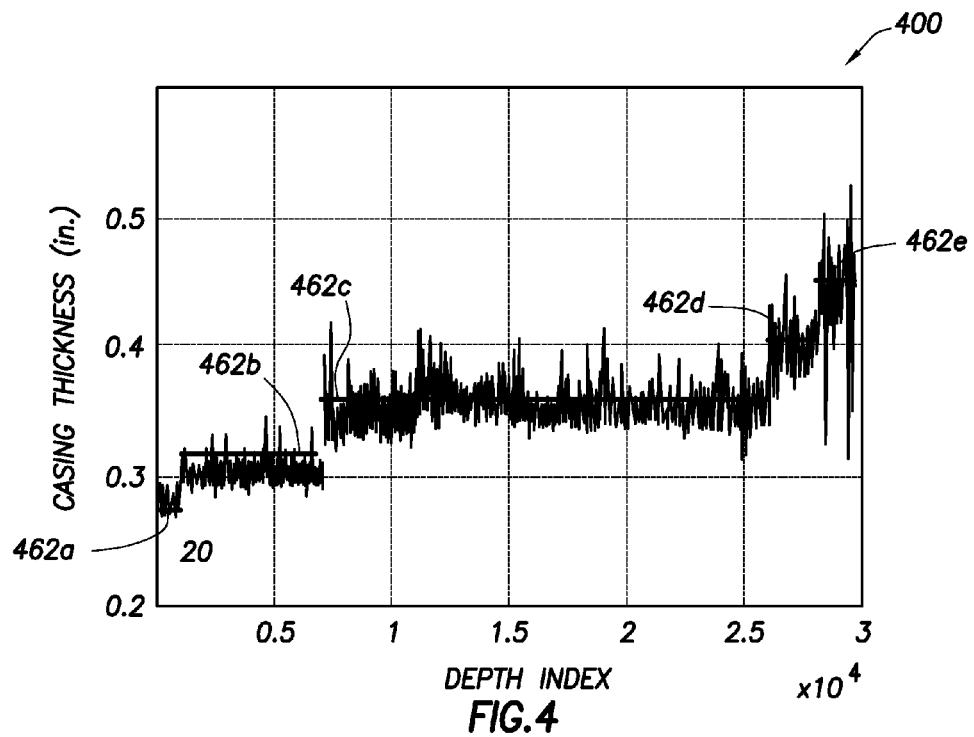
FIG. 4 is a graph depicting back-scatter-based casing thickness.

FIG. 4 is a graph 400 showing a backscatter window (BSW) response 462a-e from a sampling of field tests taken over the range of five different 7.00 inch (17.78 mm) casing weights, respectively, namely 20 lbm/ft (29.76 kg/m), 23 lbm/ft (34.23 kg/m), 26 lbm/ft (38.69 kg/m), 29 lbm/ft (43.16 kg/m) and 32 lbm/ft (47.62 kg/m). The graph 400 depicts casing thickness (y-axis) versus depth index (x-axis). This casing thickness measurement by the BSW detector may be used to confirm existing casing thickness data. The BSW casing thickness measurement may also be used to confirm specified casing weight (and/or thickness).

Figure 5:
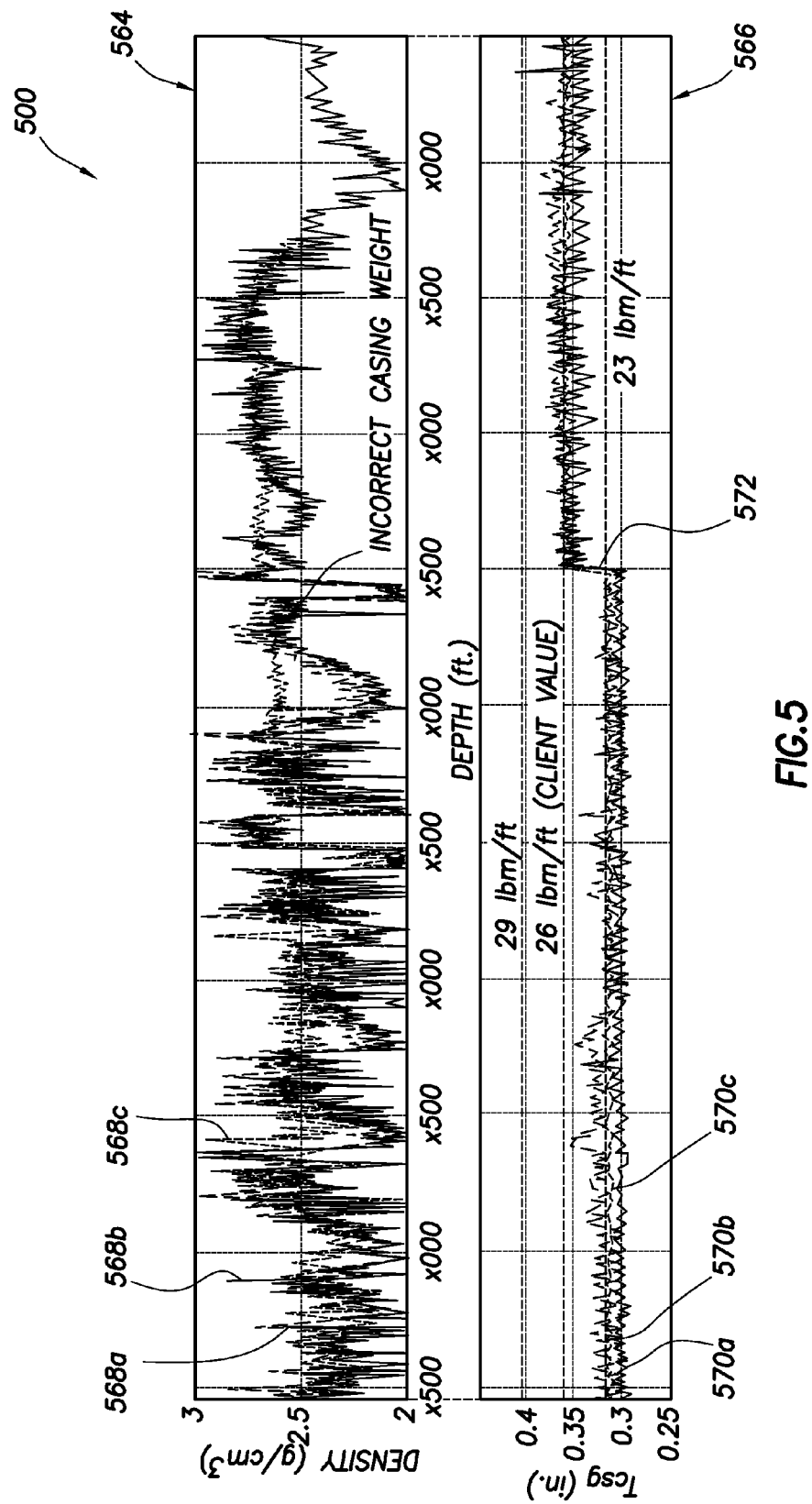
FIG. 5 is a log depicting comparisons of open-hole and cased hole measurements and casing thickness error.

The following example demonstrates the importance of casing thickness accuracy. The example depicted in FIGS. 5 and 6 demonstrates the effect of running a density log with the incorrect casing thickness. As shown in FIG. 5, there is an undocumented casing weight change 572 at a depth of 500.00 ft (152.40 m). FIG. 5 is a graph 500 having a density chart 564 with a quality overlay 566. The density chart 564 is a standard density log of density (y-axis) versus depth (x-axis) for a cased hole density log 568a using a casing weight of 23 lbm/ft (34.23 kg/m), a cased hole density log 568b using a casing weight of 26 lbm/ft (38.69 kg/m), and an open hole density log 568c. The quality overlay 566 displays all available casing thickness measurements, such as the BSW thickness 570a, ultra-sonic based thickness (THAV) 570b, and cased hole caliper 570c.

The graph of FIG. 5 indicates that the open-hole density log 568c, and a cased hole density log 568a have an incorrect density resulting from inadvertently running the upper log section with the incorrect casing weight 26 lbm/ft (38.69 kg/m), rather than the correct casing weight of 23 lbm/ft (34.23 kg/m).

Figure 6:
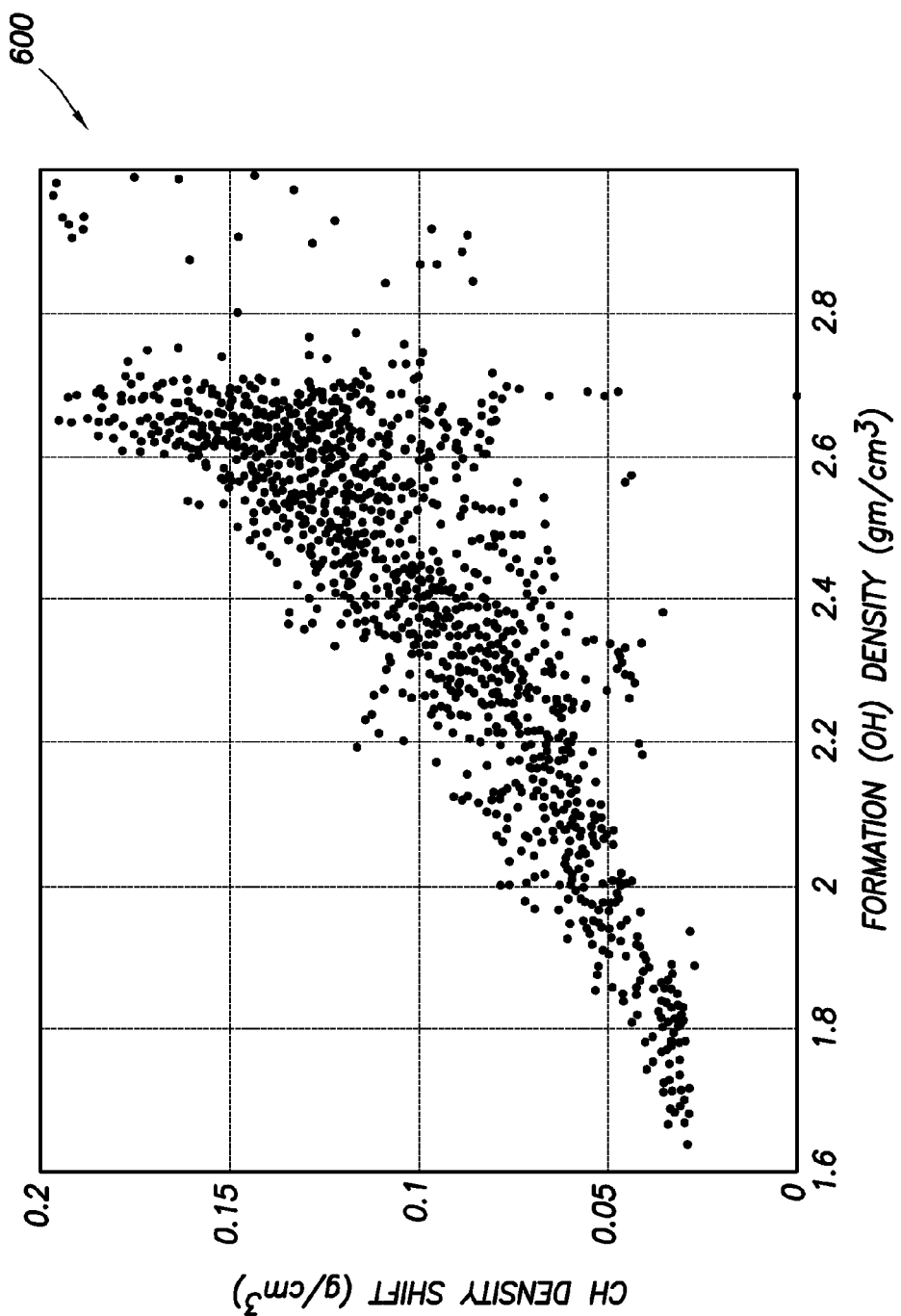
FIG. 6 is a graph depicting density error using incorrect casing weight.

FIG. 6 is a graph 600 depicting corresponding errors (density shifts) resulting from using the incorrect casing weight of FIG. 5. The graph 600 depicts a cased hole density shift (y-axis) versus formation open hole density (x-axis). As seen in this graph, the density error as quantified in FIG. 6 may be quite substantial, especially at higher densities.

Figure 7:
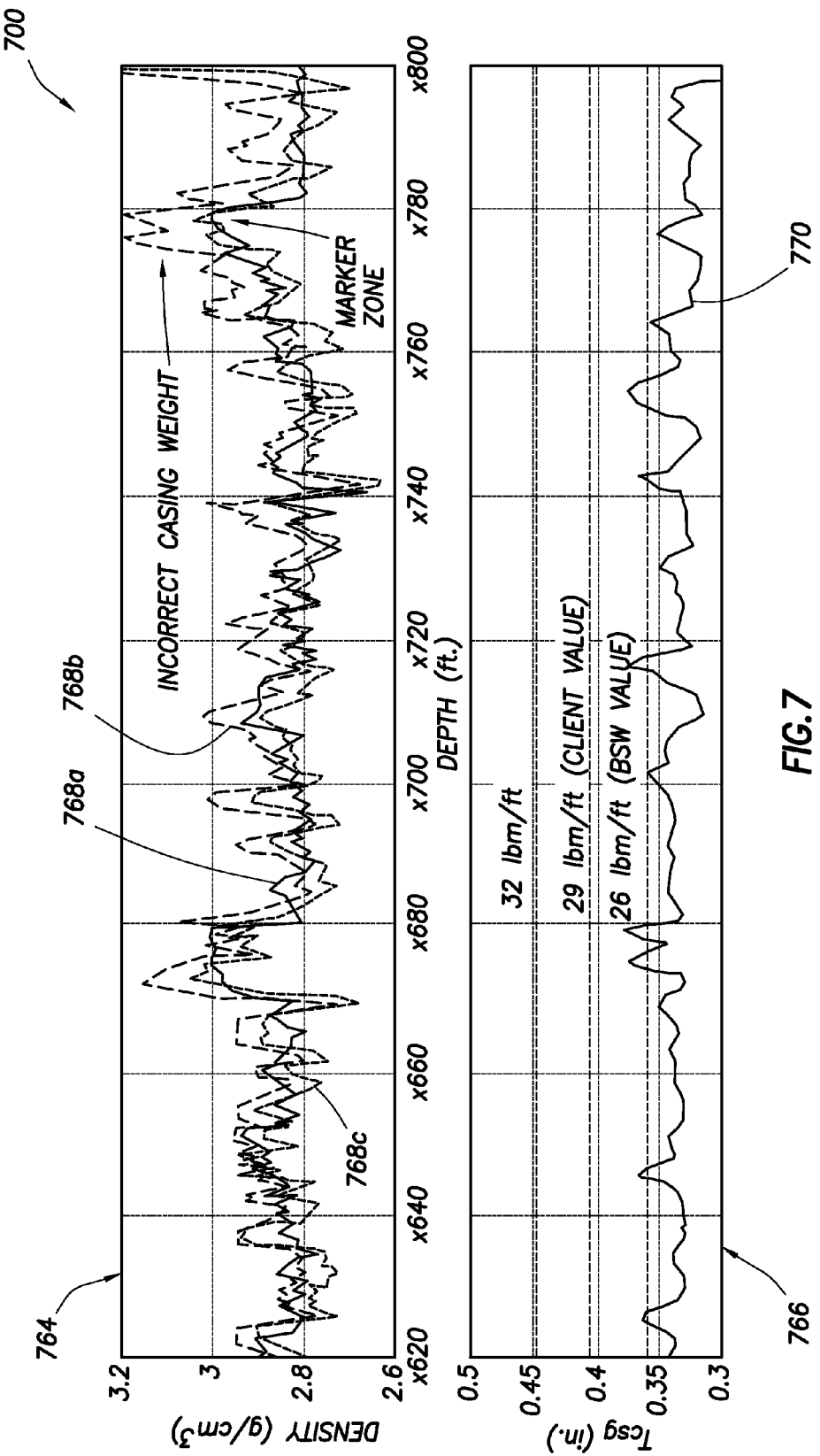
FIG. 7 is a log depicting density error using incorrect casing weight.

FIG. 7 depicts another example where the backscatter (BS) thickness detects an incorrect casing weight specification. FIG. 7 shows a graph 700 having a density chart 764 and a quality overlay 766. The density chart 764 plots density (y-axis) versus depth (x-axis) for a open hole density log 768a, a cased hole density log 768b with a casing weight of 29 lbm/ft (43.16 kg/m), and a cased hole density log 768c with a casing weight of 26 lbm/ft (38.69 kg/m). The quality overlay 766 depicts the casing thickness 770 corresponding to the depths and densities of the density chart 764.

In this case, the wellsite information indicates the weight of all casing joints to be 29 lbm/ft (43.16 kg/m). However, the BSW detector indicates that the casing joints have a weight of 26 lbm/ft (38.69 kg/m). There is a known marker zone in this logged interval to verify that the BSW readings are accurate, even without the benefit of the open-hole density log. If the erroneous 29 lbm/ft (43.16 kg/m) value is used in the density calculation, the density error would exceed about 0.1 g/cm$^3$. However, if the correct BSW weight of 26 lbm/ft (38.69 kg/m) is used, the density log aligns with the open-hole log.

Figure 8:
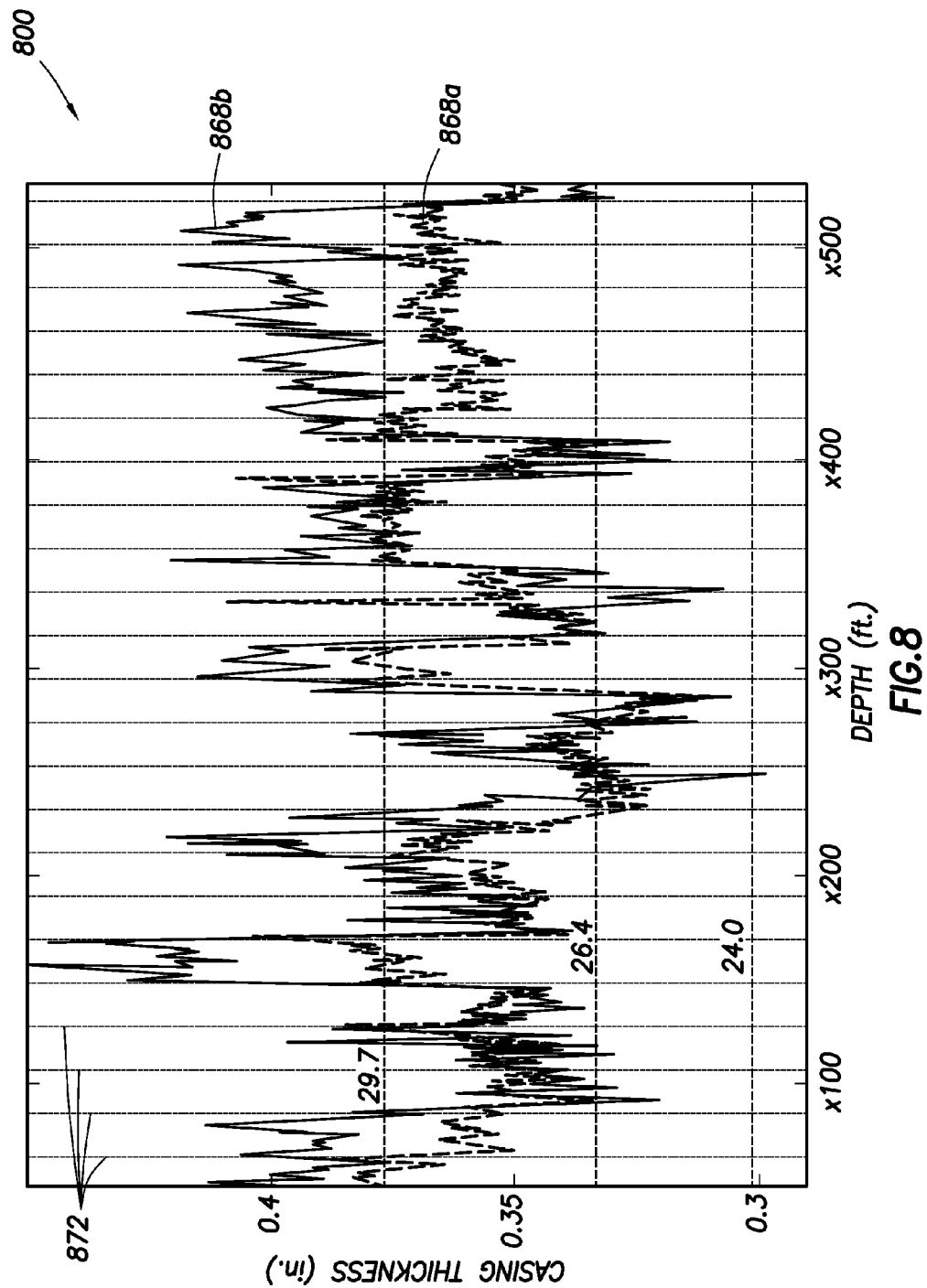
FIG. 8 is a log depicting a mix of casing weights.

A third example demonstrates the effect of having multiple casing thicknesses in a wellbore. FIG. 8 is a graph 800 depicting casing thickness (y-axis) versus depth (x-axis) for a cased hole caliper log 868a and BSW log 868b. In this case, two different casing weights are seemingly mixed at random. In the graph, casing collar locations are depicted at vertical lines 872. The casing thickness changes detected by both the BSW log 868b and the caliper log 868a coincide with the casing collars, further suggesting that these changes in casing weight are real. Tools, such as an ultrasonic tool, may also be used to detect casing collars 19.

Figure 9:
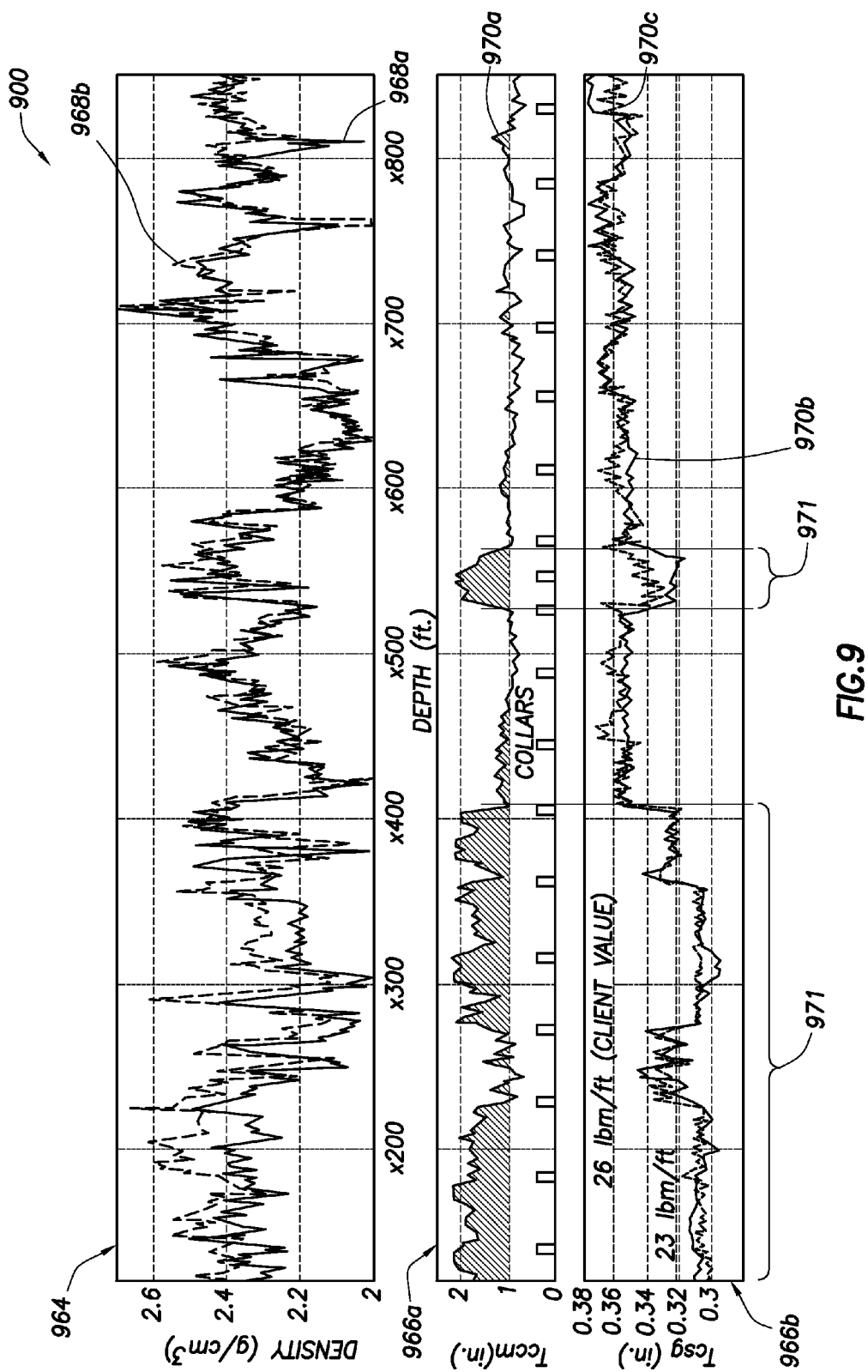
FIG. 9 is a log depicting the effect of fictitious cement.

A fourth example demonstrates the impact of incorrect casing thickness on cement thickness. FIG. 9 is a graph 900 including a density chart 964 with a cement quality overlay 966a and a casing quality overlay 966b. The density chart 964 is a standard density log of density (y-axis) versus depth (x-axis) for a cased hole density 968a and an open hole density 968b. The cement quality overlay 966a is a plot of cement thickness 970a taken by the BSW detector. The casing quality overlay 966b depicts a plot of casing thickness 970b, and a casing thickness taken by the caliper 970c. This graph illustrates another undesirable side effect of using an incorrect casing thickness: an erroneous cement thickness.

As demonstrated by FIG. 9, some unexpected 23 lbm/ft (34.23 kg/m) casing joints are interspersed near the top of the logged interval. If the entire log is processed with the supplied value of 26 lbm/ft (38.69 kg/m), several erroneous "thick cement zones" 971 are computed. These thick cement zones 971 coincide with places where lighter casing is detected. Also, the calculated cased hole density shown in the density chart 964 reads at least 0.10 g/cm³ greater than the open-hole density in these zones 971. If cement was truly this thick, the cased hole density of the density chart 964 would likely read lower than the open-hole density.

Figure 10:
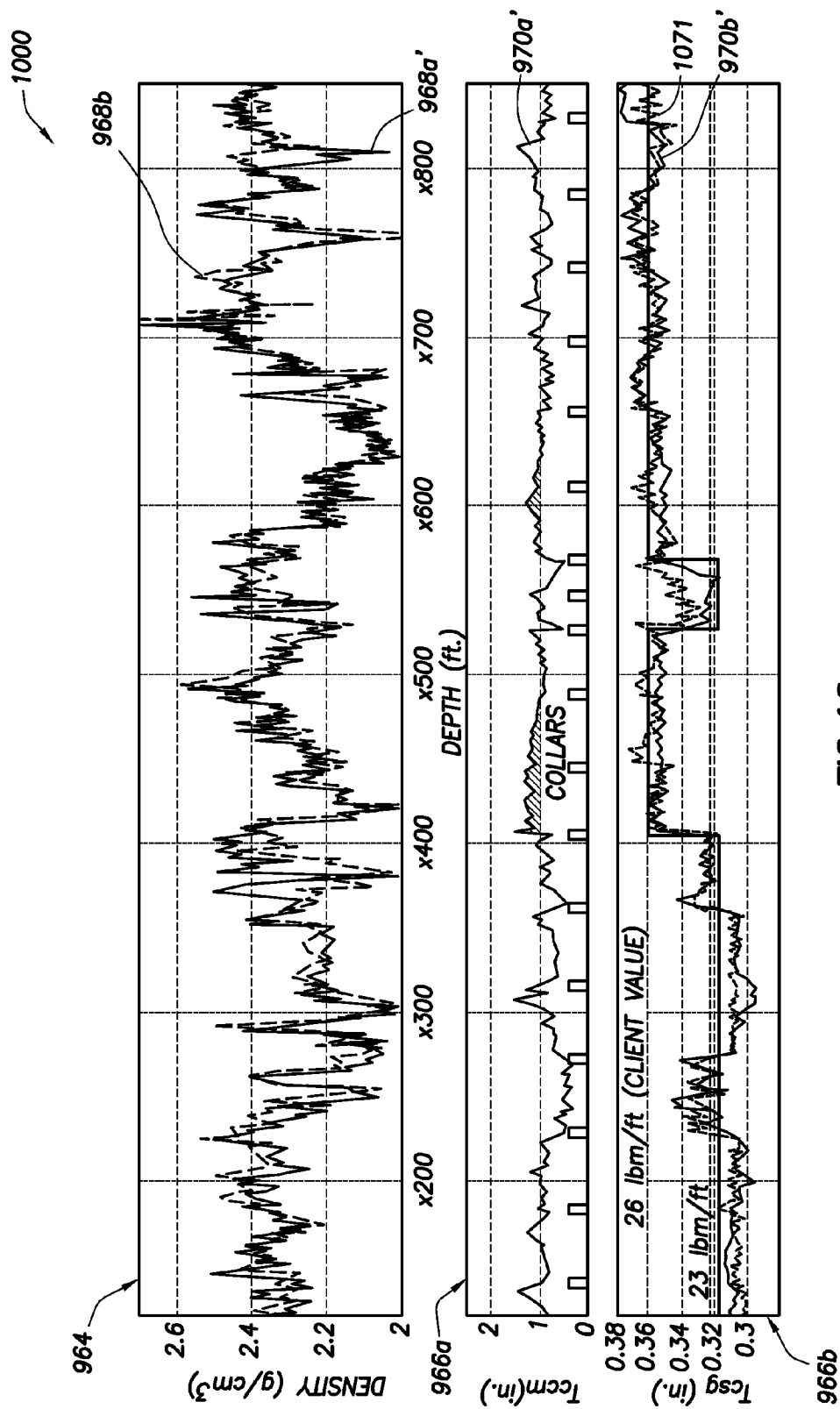
FIG. 10 is a log depicting results using correct casing thickness.

As shown in FIG. 10, if the lighter casings are properly identified, the erroneous thick cement readings disappear and the cased hole density matches the open-hole density. FIG. 10 is a graph 1000 including the density chart 964, cement quality overlay 966a and casing quality overlay 966b. In this version of the density chart 964, the casing joints have been removed, the cement thickness 970a' adjusted, and the casing thickness 970b' modified into a zoned value 1071. These changes modify the cased hole density log 968a to provide an adjusted cased hole density log 968a'. The cased hole density log 968a' aligns more closely with the open hole density log 968b. Thus, adjusting the data for the casing joints yields a more accurate cased hole density log 968a'.

A fifth example demonstrates error generated by accumulations along the wellbore. FIG. 11 includes a density chart 1100 depicting a standard density log 1164 of density (y-axis) versus depth (x-axis) for a cased hole density log 1168a and an open hole density log 1168b. A casing overlay 1166 depicts casing thickness for a BSW 1170a and a cased hole caliper 1170b. FIG. 11 depicts an anti-correlation between the BSW thickness and the cased hole caliper thickness, not seen in the previous examples. The thickness variations excursions are relatively large (of the order of 3 to 4 casing weight equivalents). There are also corresponding large errors in cased hole density. It is clear from the caliper that there is an additional 0.15 inches (0.38 cm) to 0.20 inches (0.51 mm) of "material" on the inside of the casing, which also adversely affects the BSW readings. These logs may indicate the presence of mineral scale in the form of accumulations at perforations in the casing. This signature offers yet another example of zones where cased hole density log may not be accurate.

In some cases, typical open-hole tool calipers may not be accurate enough by themselves to determine casing weight (thickness). For example, the thickness difference between adjacent 7.00 inch (17.78 mm) casing weights (e.g., 23 lbm/ft (34.23 kg/m), 26 lbm/ft (38.69 kg/m), 29 lbm/ft (43.16 kg/m)) is approximately 0.04 in (0.10 cm). Although an open-hole caliper does not possess sufficient accuracy in this case, the caliper may nevertheless still be used to detect unexpected changes in casing weight.

As demonstrated by the examples in FIGS. 3 and 6, cased hole density log may be quite sensitive to casing thickness. Based on the casing size and weight parameters, a single thickness value (Equation (4)) may be provided. However, casings and related conditions may not be suitable for the parameters of the single thickness value. Some variations may occur in the actual casing inner diameter (depth-by-depth), caused by manufacturing or other imperfections. Even slight variations in the actual casing thickness may introduce additional errors in cased hole density logs. For example, an incorrect value of casing thickness may generate an inaccurate density log. Although the inner diameter of a casing joint may not be relevant to a good well completion (cement job), it may affect the cased hole density response. Additional logging devices may aid in quantifying casing thickness. As shown in FIG. 1, detectors, such as the LS, SS, BS (e.g., BSW thickness stand-alone measurement), caliper, and/or ultrasonic tool, may be used with the existing downhole tool 20 to avoid errors by incorrect casing thickness specifications.

Casing Collar

Measuring through a casing collar may produce a large, narrow, positive-going density spike on a density log. Collar locator may be presented to help identify and filter out the effects of real casing collars, such as the casing collar 19 depicted in FIG. 1. However, the casing collar spike may be very similar in shape to many thin formation (or "tight") zones. The collar locator techniques may be configured to identify and filter out the casing collars, while avoiding false collar detections.

Figure 12:
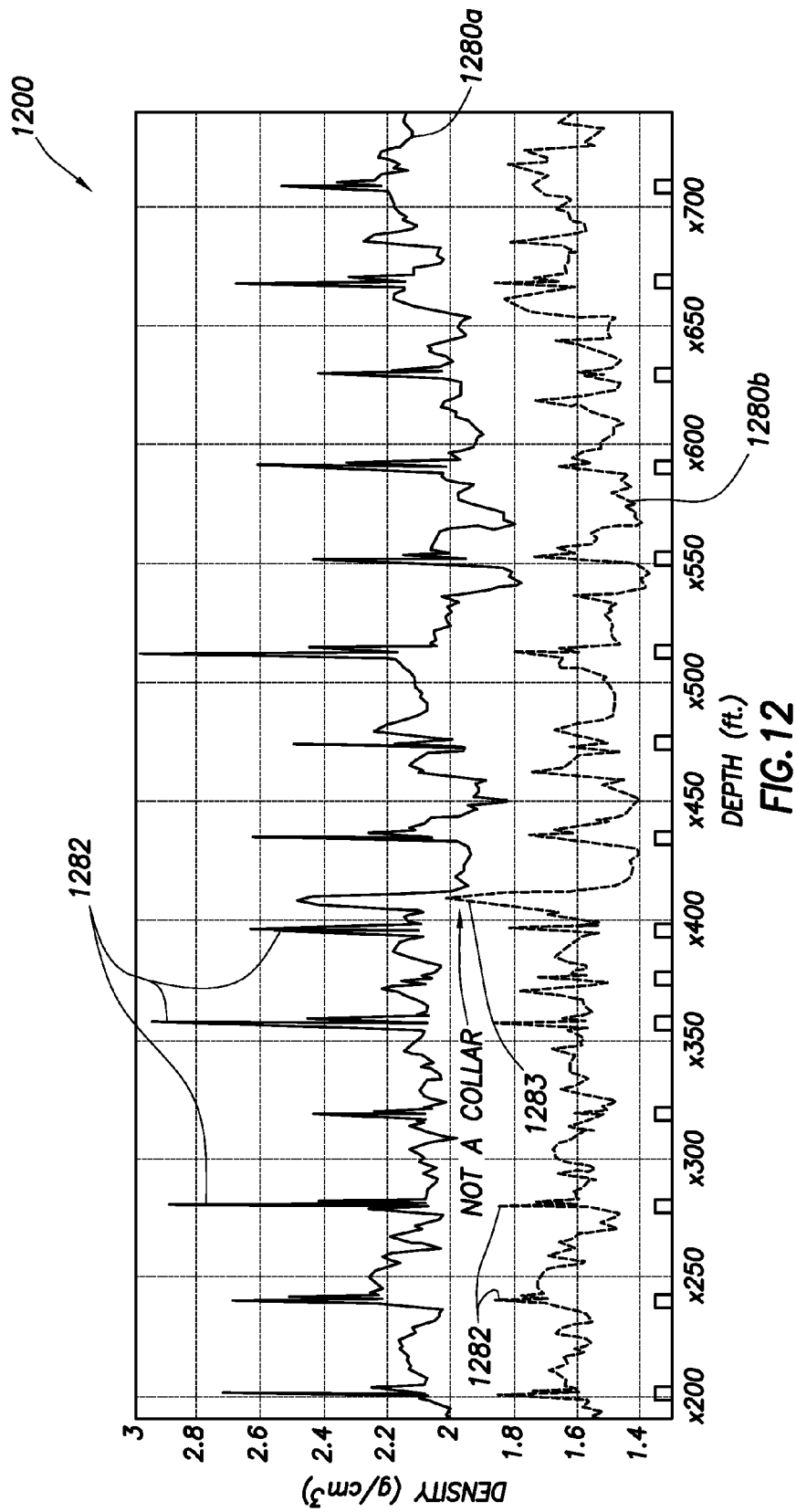
FIG. 12 is a log depicting casing collar spikes.

As shown in FIG. 12, casing collars may produce detectable spikes in density measurements taken by detectors, such as the LS detector and/or the SS detector of FIG. 1. FIG. 12 is a graph 1200 depicting density (y-axis) versus depth (x-axis) and generating a density log 1280a taken by the LS detector and a density log 1280b taken by the SS detector. Spikes 1282 along the LS density log 1280a indicate the presence of casing collars, such as the casing collar 19 of FIG. 1. However, a spike 1283 depicted at a depth of about x410 is generated from a thin, tight structure in the formation, rather than a casing collar.

Upon detection of the suspected collars at spikes 1282 in density log 1280a, the data for spikes 1282 may be removed and the window count-rates linearly interpolated between the collar boundaries to generate a compensated LS density log. As shown in FIG. 12, the spikes on the log identify places where collars have been identified and count-rates interpolated. The spike 1283 has been identified as resulting from a cause other than a casing collar and remains in the compensated LS density log. Should a few false or missing collar detections be made, the linear interpolations should not materially affect a cased hole formation evaluation. By comparison a false collar detection may create less error than undetected thick cement or an incorrect casing thickness.

Figure 13:
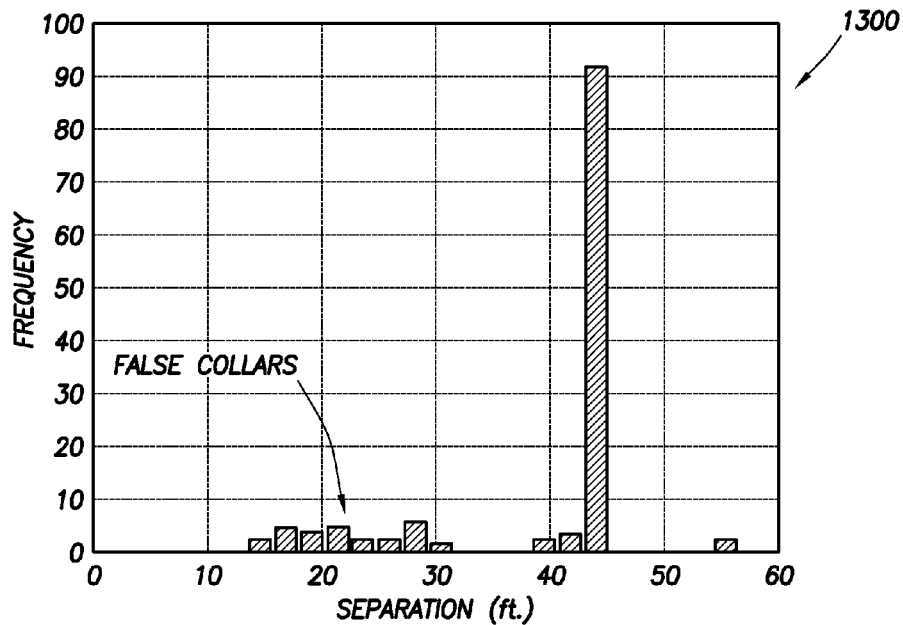
FIG. 13 is a histogram depicting false collars on casing lengths.

Additional techniques may be implemented to further validate and/or refine the casing collar profile. A first casing collar locator technique may be used to detect casing collars at predicted positions along the casing based on casing lengths. FIG. 13 depicts a graph 1300 depicting a casing length histogram based on density-based collar detections. The graph 1300 depicts a frequency (y-axis) versus a separation (x-axis) for a given pipe. Normally, all casing collars should occur at a regular, fixed spacing, or perhaps occasionally at a smaller spacing if a pup joint is used. Usually, a single peak will be detected over a given pipe length. However, when thin, tight formation structures become difficult to distinguish from collars, then a few false collar detections may occur as shown in FIG. 13. False collar detections may be more prevalent in high-density (typically carbonate) sequences.

A second casing collar locator technique uses a similar histogram of the density-based collar widths. An observed width (such as detector resolution matching and depth smoothing) may be about 4.5 ft (1.37 m) to about 5 ft (1.52 m). Narrower or wider widths may indicate false collar detections.

Figure 14:
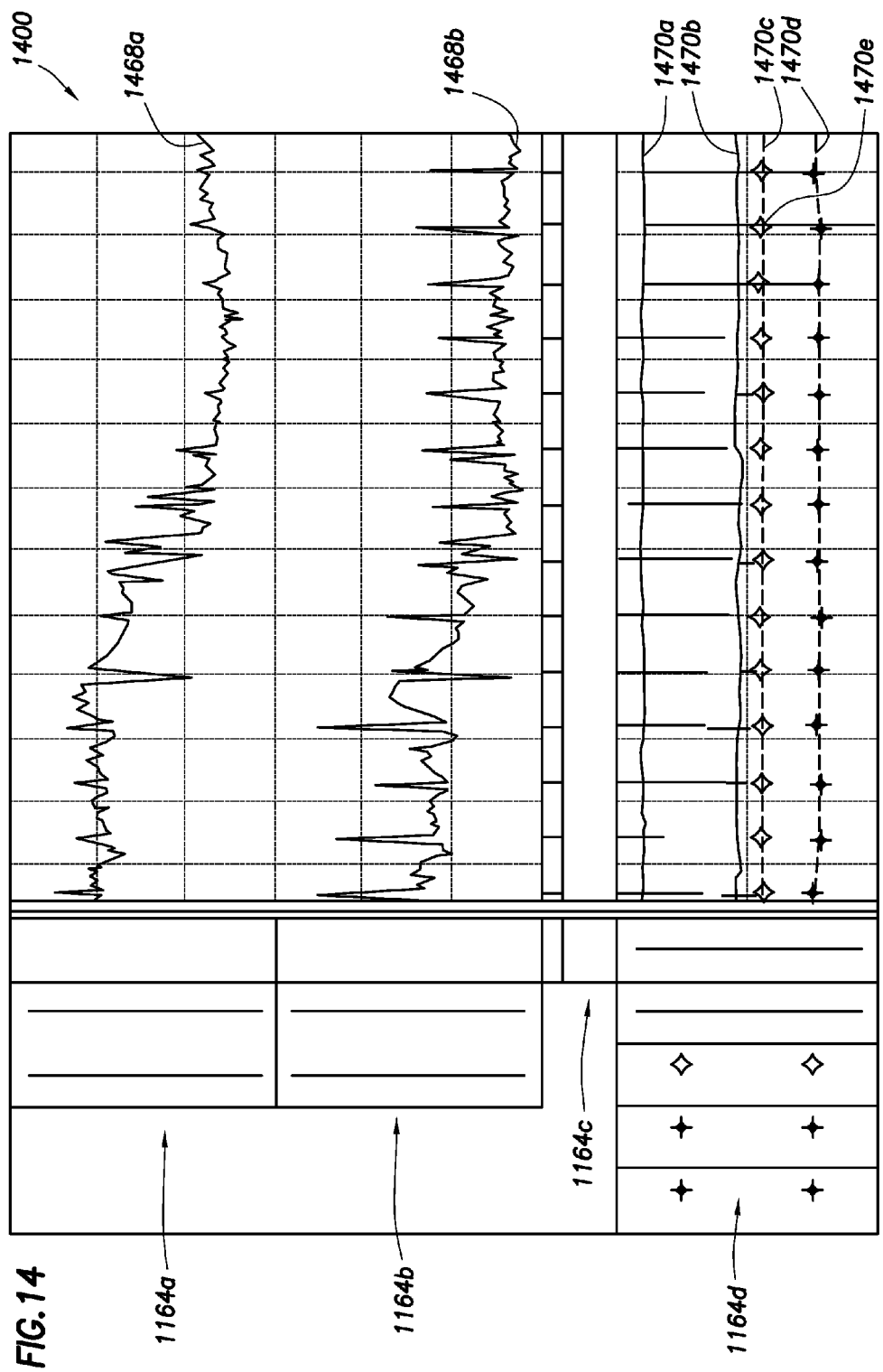
FIG. 14 is a log depicting density-based collar locations from multiple sources.

A third casing collar locator technique may be used to merge available collar information, such as those generated by the density, sonics and magnetic tools, with the detector densities, such as the LS and SS apparent densities. FIG. 14 is a graph 1400 depicting a density log 1468a (at track 1164a) generated by a raw SS detector and a density log 1468b (at track 1164b) generated by a collar-corrected LS detector (similar to those as described with respect to FIG. 12). The graph 1400 has a track 1164d also depicting various density-based collar 1470a-e made by multiple sources. A fourth track 1164c redundantly indicates the density-based collar detections.

Figure 15:
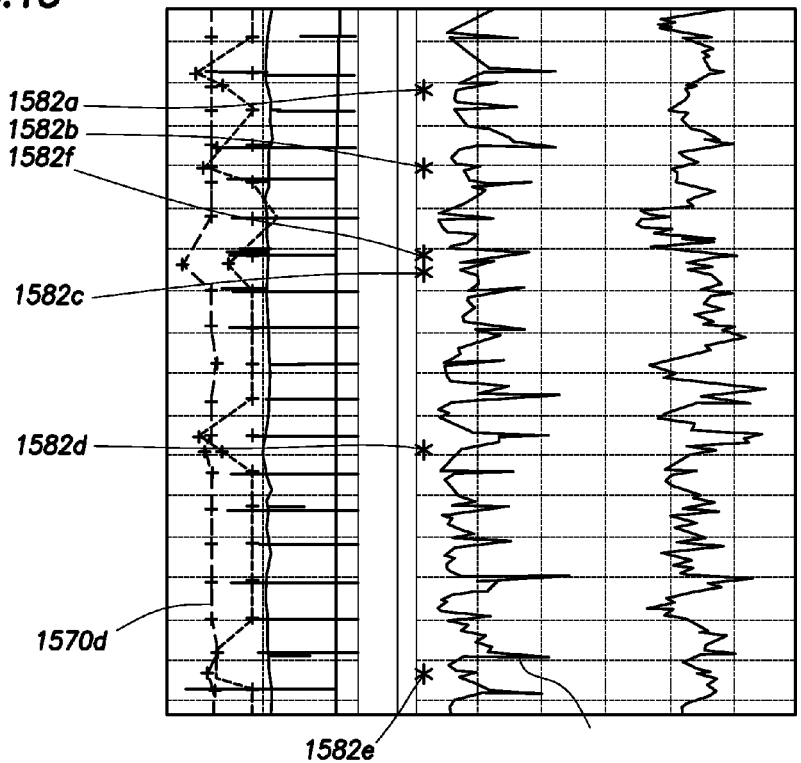
FIG. 15 is a log depicting a compensated density based on the located collars of FIG. 14.

FIG. 15 is a graph 1500 depicting another excerpt from the same log of FIG. 14 and the collars from FIG. 13 where the sonics tool and a casing collar locator help to refine the collar profile. These tools may be used to help identify false collar detections 1582a-e at various depths, and one missed collar 1582f. The density data at these detections may be added, removed, or otherwise depth-edited in the final collar profile. The density logs may be re-run with the casing collar data 1570d removed.

The casing collar techniques may be provided to help assure that no collars are missed and that no false collars are detected. A missed collar may allow a "spike" leak into the density log; whereas, a false collar may result in valid formation information being filtered out of the density log.

Cement Thickness

A challenge in density logging is the ability to correctly identify zones where density is reliable versus zones where density logs may be corrupted by thick cement. FIG. 16 is a graph 1600 depicting a comparison between an open hole log and a cased hole log to illustrate how variable cement thickness can corrupt an otherwise accurate density log. Effects of thick cement on density measurement are depicted in the shaded areas 1686 between an open-hole density curve 1668a and a cased hole curve 1668b.

To address errors caused by cement thickness, two techniques have been developed to quantify cement thickness: one is based on a Photoelectric Effect (Pe) measurement, and the other based on density.

1. Photoelectric Effect (Pe)-Based Cement Thickness Quantification

The apparent formation Pe may be biased to higher values by casing, but may still be measured by the customary method of comparing a high-energy region ($W_2$) of the gamma-ray spectrum that is mostly Compton-sensitive (related to density), with a low-energy region ($W_1$) that contains both a Pe and a Compton sensitivity. Solving Equation (1) for the Pe term for this pair of energy windows results in the following:

$$Pe = \frac{\ln\left(\frac{W_2^{\mu 1}}{W_1^{\mu 2}}\right) - L_2\mu_1 + L_1\mu_2}{\ln\left(\frac{W_2^{\nu 1}}{W_1^{\nu 2}}\right) - L_2\nu_1 + L_1\nu_2} \quad \text{Equation (5)}$$

where $\mu_{1,2}$ and $\nu_{1,2}$, are as previously defined. $\mu$ and $\nu$ are related to a Compton scattering and photoelectric absorption cross-sections, respectively, for the high and low energy regions, respectively, and where and $L_{1,2}$ is the normalization factor constant for a given energy window, for the high and low energy regions, respectively.

Estimates of the apparent Pe measured by the downhole tool as described by Equation (1) can be modeled by assuming a half-sphere of radius R on a density pad surface of the downhole tool 20 hosting the detectors BS, LS, SS and radiation source 11 of FIG. 1. If we assume only two materials are present (casing and formation, or casing and cement), the apparent Pe may be computed as a volumetric (or areal) and weight-fraction mix of the Pe values of the two components as follows:

$$Pe = \Sigma m_i Pe_i, \text{where } i=1 \text{ to } 2 \quad \text{Equation (6)}$$

where $m_i$ are the weight fractions, given by:

$$m_i = \frac{V_i \rho_i}{\Sigma V_k \rho_k}, \text{ where } k = 1 \text{ to } 2 \quad \text{Equation (7)}$$

and where $V_i$ are the material volumes and $\rho_i$ the material densities. The respective material volumes are given by:

$$V_1 = \frac{R^2}{2}\operatorname{asin}\left(\frac{\lambda}{R}\right) + \frac{\lambda\sqrt{R^2-\lambda^2}}{2} \quad \text{Equation (8)}$$

and $$V_2 = \frac{\pi}{4}R^2 - V_i \quad \text{Equation (9)}$$

where $\lambda$ is casing thickness.

Figure 17:
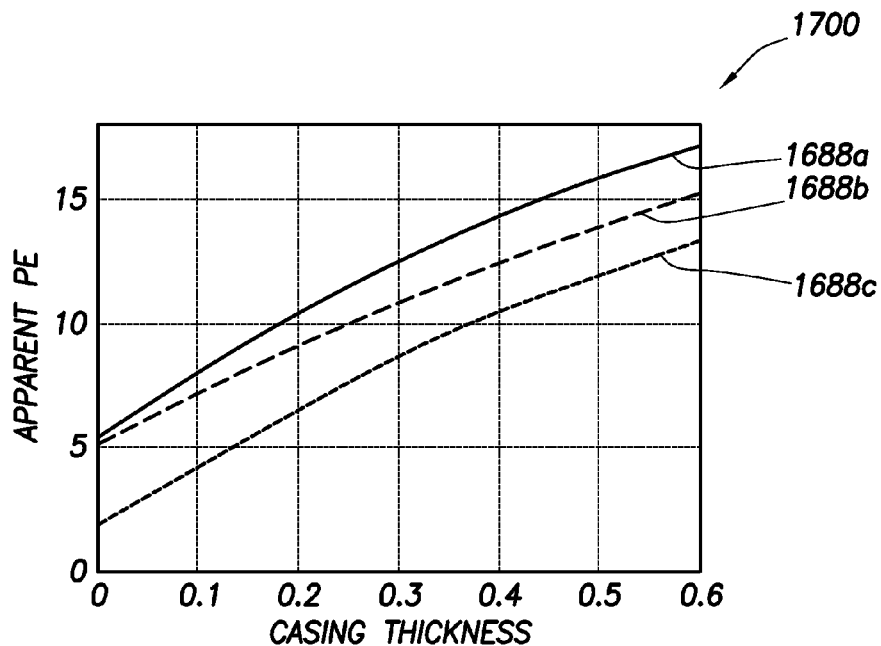
FIG. 17 is a graph depicting calculated apparent photoelectric effect.

FIG. 17 is a graph 1700 of apparent Pe (y-axis) versus casing thickness (x-axis). The graph depicts a calculated apparent Pe for lime 1688a, sand 1688b, and cement 1688c (class G). The relatively high values are due to the high Pe of the steel casing, approximately equal to 31.00 lbm/ft (4.61 g/cm).

For a typical casing thickness of about 0.30 inches (0.76 cm) to about 0.40 inches (1.02 cm), the cement Pe may be several Pe units higher than for common formation composition, such as sandstone, limestone, shale, or other rocks. Based on this observation, a Pe-based cement thickness indicator called "$\Delta Pe$" may be defined as the difference between the calculated Pe of typical cement ($Pe_{cem}$) and the measured apparent formation Pe ($Pe_f$) as follows:

$$\Delta Pe = Pe_{cem} - Pe_f \quad \text{Equation (10).}$$

In thick cements, the measured Pe, especially from SS, may approach $Pe_{cem}$, resulting in a $\Delta Pe$ of nearly zero. For thin cements, $\Delta Pe$ may be a few units negative, as more formation signal is seen. This method may be considered semi-quantitative because the actual cement $Pe_{cem}$ may be different from the average cement Pe used in the algorithm, and also because lithology variations may affect $\Delta Pe$.

2. Apparent Density-Based Cement Thickness Quantification

A small cement thickness $h_{cem}$, (where $h_{cem} \ll h_{sat}$) can be expressed as:

$$h_{cem} = h_{sat,LS} \operatorname{atanh} \frac{\rho_f - \rho_{LS}}{\rho_f - \rho_{cem}} \quad \text{Equation (11)}$$

where $h_{sat,LS}$ is the LS cement saturation length, $\rho_f$ is the formation density, $\rho_{LS}$ is the apparent casing-corrected LS density, and $\rho_{cem}$, is the cement density. The inverse hyperbolic tangent function may be chosen to approximate the shape of the cement response function $f(0,h_{cem})$.

Computation of cement thickness may require both cement density and formation density. The spine and ribs density may be substituted for the formation density to obtain an apparent cement thickness $h_{app}$ that responds directly to cement thickness, and needs only to be calibrated against an true cement thickness $h_{true}$ as determined from known data. Thus, $$h_{app} = L_{sat,LS} \text{atanh}\left(\chi \frac{f_{SS}(h) - f_{LS}(h)}{1 - f_{SS}(h) + \chi(f_{SS}(h) - f_{LS}(h))}\right) \quad \text{Equation (12)}$$

where $\chi$ is defined herein (see Equation (18)).

Figure 18:
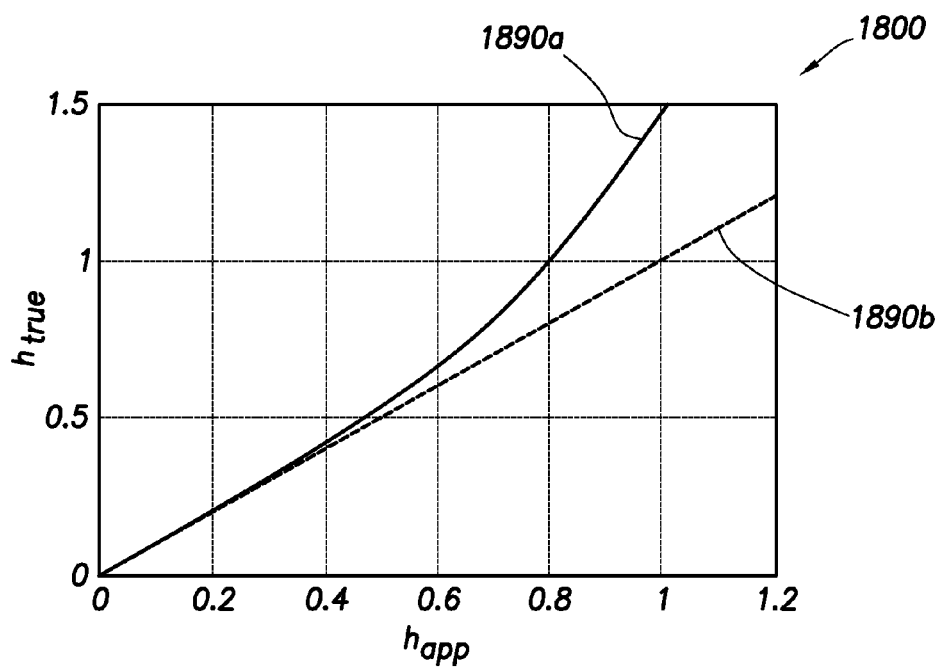
FIG. 18 is a graph depicting calibration based on cement thickness.

The calibration may be obtained by normalizing $h_{app}$ to a known cement thickness in well-controlled laboratory environments, as shown in FIG. 18. FIG. 18 is a graph 1800 depicting calibration to a known cement thickness. The graph 1800 depicts true thickness (y-axis) versus apparent thickness (x-axis) for a thickness response 1890a and a known 45 degree reference 1890b.

For small values of cement thickness, $h_{app}$ is a good approximation of $h_{true}$, but thereafter may underestimate $h_{true}$. The transformation between $h_{app}$ and $h_{true}$ may be a low-order polynomial. Based on laboratory studies and a wide variety of field tests, the cement thickness limit for this particular density tool model may be, for example, about 1.09 inches (2.54 cm).

The cement thickness estimate may be dependent on cement density. In such cases, it may be important to know the density of the cement used in the well, and consult the well completion reports. Alternatively, in zones where the $\Delta$Pe indicates thick cement, the SS apparent density frequently saturates ("flat-lines"), giving a good in-situ value for cement density. The sensitivity of calculated cement thickness to cement density may increase for higher cement densities. This follows directly from the $\rho_{cem}$ term in the denominator of Equation (11).

The cement thickness quantifier may be a double-valued function and may read near zero thickness in very thin and very thick cement. This is because both LS and SS apparent densities read the same in an infinite medium, whether the infinite medium is formation or cement. By contrast, $\Delta$Pe is a single-valued function and its reading may be used to differentiate the rare cases where cement is so thick as to cause a low density-based reading.

Figure 19A:
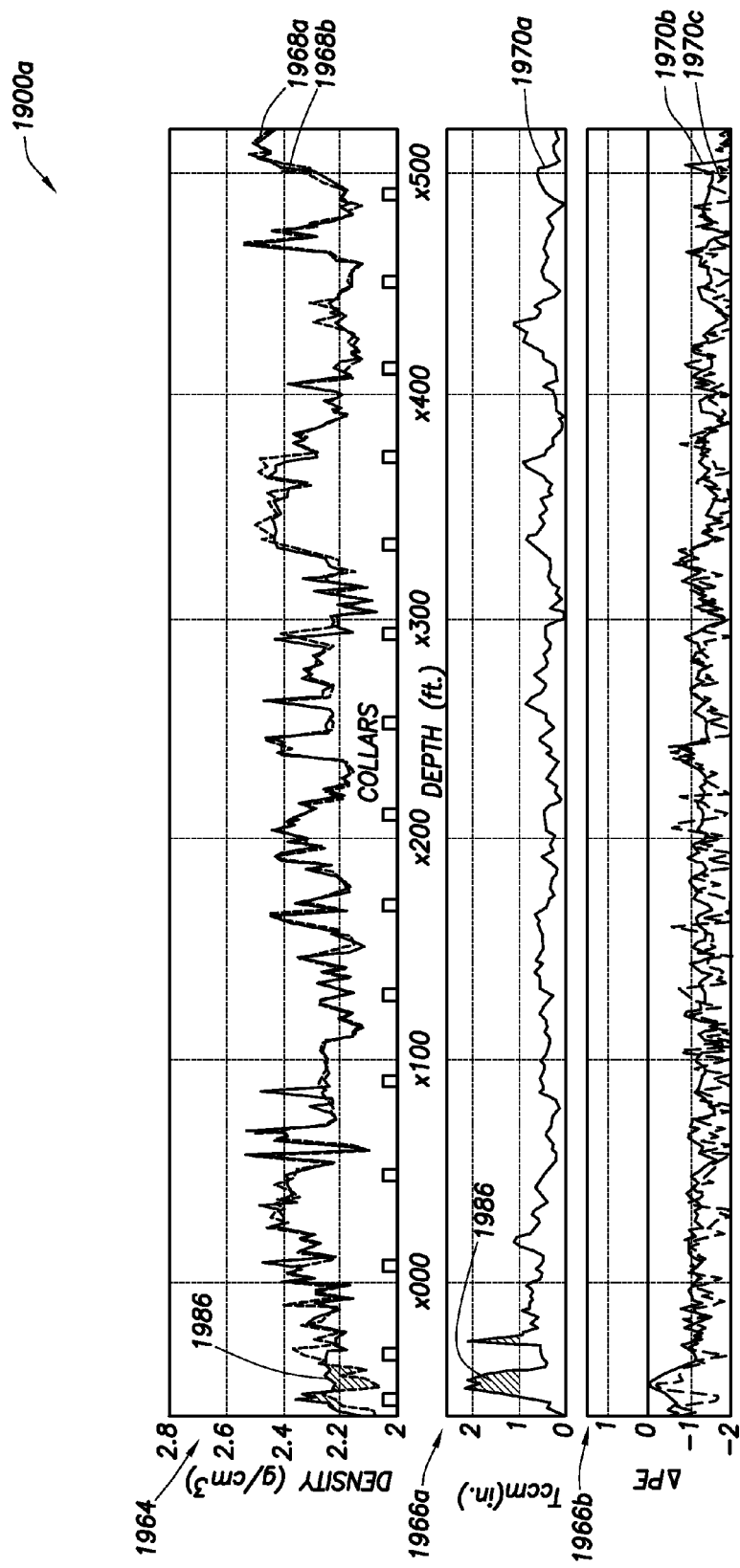
FIGS. 19A-19C are logs depicting comparisons of open-hole and cased hole measurements and cement error.
Figure 19B:
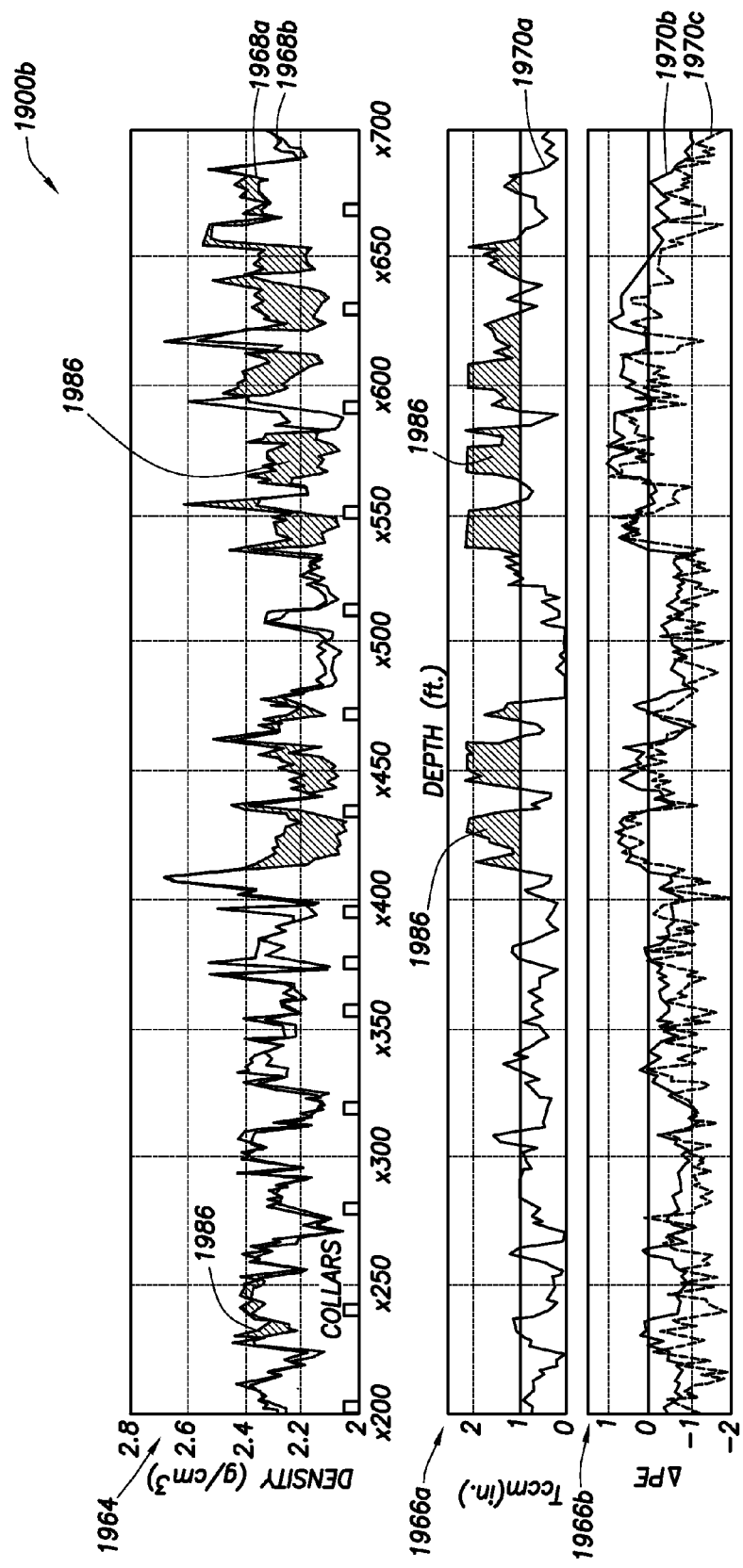
Figure 19C:
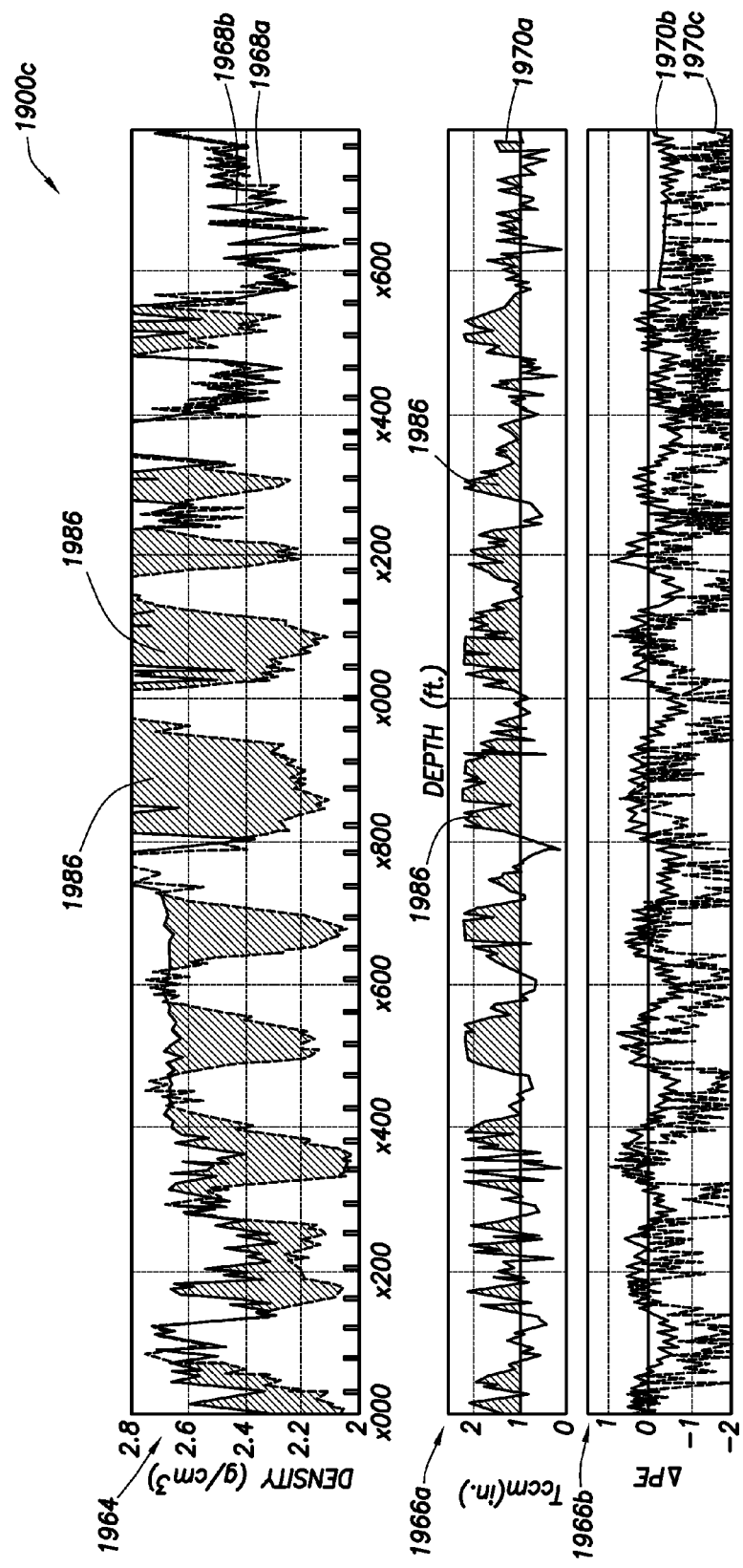

FIGS. 19A-19C depict examples of open hole and cased hole densities, as well as the Pe-based cement thickness ($\Delta$Pe) and the density-based thickness ($T_{cem}$). These Figures depict graphs 1900a,b,c, respectively, each having a density chart 1964a,b,c, respectively, depicting an open hole density log 1968a, a', a'' and a cased hole density log 1968b, b', b'', cement thickness overlay 1966a,a',a'' depicting thickness 1970a,a',a'' and Pe overlay 1966b,b',b'' depicting an SS $\Delta$Pe 1970b and an LS $\Delta$Pe 1970c. Over the zones where the calculated cement thickness exceeds a 1.00 inch (2.54 cm) limit, the density-based cement thickness curve and the difference between the open hole and cased hole densities are shaded regions 1986.

FIG. 19A is a "good" density log. Note that $\Delta$Pe is several units negative (indicating thin cement) and the density-based thickness is consistently less than the tool limit of 1.00 inch (2.54 cm). There is only one small interval with thick cement, and this is detected by both cement thickness quantifiers $\Delta$Pe 1966b and $T_{cem}$ 1966a.

In the example in FIG. 19B, about 50 percent of the logged interval is affected by thick cement. Each of these occurrences is identified by both cement thickness indicators and flagged on the density log presentation. The $\Delta$Pe can be scaled based on "thick" and "thin" cement to yield a cement thickness.

FIG. 19C is a somewhat extreme case with approximately only 10 percent of the logged interval displaying a valid cased hole density log. Both indicators clearly identify these regions. The alternation between formation and cement readings may be due to a slow toolstring rotation during the survey, in a somewhat eccentered casing. This may create a variation in cement thickness in the direction of casing eccentering. A sensor measuring toolstring relative bearing may confirm the tool rotation.

The ability to know when a cased hole density log is valid may assist in confirming density measurements. The Pe and apparent density techniques may be used to determine valid measurements and/or to indicate where adjustments are needed.

Adequate Statistical Precision

The accuracy of the density measurements may be determined by quantifying error relating to various aspects of the measurement process, such as logging speed, casing error, cement error, etc. For example, the presence of casing may reduce the formation density count-rate by a factor of at least about 3. The reduction may be even worse for thicker casings and high formation densities. A calculation of density precision (standard deviation) has been provided as a quantitative aid to gauge the reduction in logging speed needed to maintain adequate density precision.

Because of the reduced count-rates in a cased hole environment, the nominal density logging speed may be about 900 FPH. FIG. 20 is a cross-plot 2000 of a cased hole density standard deviation (y-axis) versus an open hole density (x-axis) normalized to 900 FPH for three jobs having a 7.00 inch (17.78 cm) casing with a casing weight 2090a of 20 lbm/ft (29.76 kg/m), a casing weight 2090b of 23 lbm/ft (34.23 kg/m), and a casing weight 2090c 29 lbm/ft (43.16 kg/m), respectively. The count-rates (hence density precision) may be affected by both formation density (see, e.g., FIG. 6) and casing thickness (see, e.g., FIG. 3). Using FIG. 16, the expected density range 2092 to be logged may be selected, the precision at 900 FPH estimated, and the logging speed adjusted accordingly to achieve the precision required. The standard deviation varies inversely with the square-root of the logging speed.

Cased Hole Density Methodology

The quality indicators may account for at least some of the differences between measurements taken by the downhole tool 20 when positioned in an open-hole versus a cased hole of the same wellsite 1. The density measurement may be adjusted based on one or more of these quality indicators and/or other criteria (alone or in combination). Additionally, by determining one or more of the quality indicators, it may be possible to predict when the formation density measurement is valid and select which data (e.g., reliable data) may be incorporated into a petrophysical evaluation. Additionally, this information may be used to quantify the quality of the density measurement. The compensated density measurement may also be used to make much more accurate measurements of other downhole parameters, such as gas saturation. Previous downhole measurements may not have been possible in some applications, such as in low porosity formations.

The cased hole density methodology uses an extension of the conventional spine and ribs methodology in which the casing and cement effects are separated (i.e., the single-detector "spines" $\rho_{LS}$, $\rho_{SS}$ include only the effect of casing, and cement is compensated by the "rib"). Single detector apparent densities ($\rho_{LS}$, $\rho_{SS}$) may read true formation density when there is no cement present (i.e., when only casing is present).

The casing and cement effects are separable, resulting in the following apparent density model:

$$\rho_{app}(\lambda, h_{cem}) = \rho_{app}(\lambda, 0) - f(\lambda, h_{cem})(\rho_{app}(\lambda, 0) - \rho_{cem}) \quad \text{Equation (13)}$$

where $\lambda$ is the casing thickness, h is the cement thickness, $f(\lambda, h_{cem})$ is the cement response function, and $\rho_{cem}$ is the cement density. The casing and cement sensitivity functions may be determined from a wide array of laboratory measurements and Monte Carlo modeling studies. The "spine term" (casing-only density) in Equation (13) may be expressed in terms of the true formation density $\rho_f$, and the casing response function $g(\lambda)$ and casing density $\rho_{cas}$ as follows:

$$\rho_{app}(\lambda, h_{cem}) = \rho_f - (g(\lambda)(\rho_f - \rho_{cas}) + (1-g(\lambda))f(\lambda, h_{cem})(\rho_f - \rho_{cem})) \quad \text{Equation (14)}$$

In the range of casing thicknesses typically encountered, the casing response function (g) is linear and may be expressed as follows:

$$g(\lambda) = \lambda/\lambda_{sat} \quad \text{Equation (15)}$$

where $\lambda_{sat}$ is the casing saturation length. Some detectors may have sensitivity limits for measuring casing saturation length. For example, SS detectors may detect a casing saturation length of less than about 2 inch (5.28 cm), and LS detectors may detect a casing saturation length of less than about 7.5 inches (19.05 cm). The equation for apparent densities $\rho_{LS}$ (or $\rho_{SS}$) may then be described as follows:

$$\rho_{LS,SS} = \frac{\frac{\ln(W_{LS,SS}) - L_{LS,SS}}{\mu_{LS,SS} + v_{LS,SS} \cdot Pe_f} - g_{LS,SS}(\lambda)\rho_{cas}}{1 - g(\lambda)} \quad \text{Equation (16)}$$

where $\rho_{cas}$ is the effective casing density. The terms W, L, $\mu$, and v were defined previously in the context of Equation (1). The term $Pe_f$ is a through-casing apparent Photoelectric Effect (Pe) measurement as described previously. To take into account the density of the casing material, the measured value of $\pi_{cas}$ used (e.g., 10 g/cm$^3$) may be slightly higher than the nominal value (7.98 g/cm$^3$) due to its high Pe absorption. The above values of LS and SS apparent densities may be used in the spine and ribs equation to arrive at the final cased hole density:

$$\rho_{CHFD} = \rho_{LS} + \chi \cdot \Delta + 1.12 \Delta^3 \quad \text{Equation (17)}$$

where $\Delta$ is the $\rho_{LS} - \rho_{SS}$ difference and $$\chi = \frac{h_{sat,SS}}{h_{sat,LS} - h_{sat,SS}} \quad \text{Equation (18)}$$

Once a compensated density log is generated based on the quality indicators and the apparent density log, the compensated density may be validated (270) using, for example, the cement error and/or statistical error. These quality indicators may indicate a level of confidence in the density log. The method may also involve generating (272) at least one photoelectric (or other) log based on at least one of the quality indicators.

The method as described may also involve other steps, such as evaluating the formation based on the compensated density. The method may be performed in a desired order, and repeated as desired.

While the embodiments are described with reference to various implementations and exploitations, it will be understood that these embodiments are illustrative and that the scope of the inventive subject matter is not limited to them. Many variations, modifications, additions and improvements are possible. For example, one or more sensors (and/or detectors) for measuring various parameters may be provided, and the data collected therefrom considered in the evaluation of the downhole parameters.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of generating a formation density measurement about a cased wellbore, the cased wellbore penetrating a subterranean formation, the method comprising:
    positioning at least one downhole tool into the cased wellbore;
    pushing a caliper of the downhole tool against a casing of the cased wellbore;
    passing radiation from the at least one downhole tool through the casing and into the subterranean formation;
    measuring the radiation and casing measurements with at least one detector of the at least one downhole tool;
    generating an energy spectrum from the measured radiation;
    using the caliper, determining a casing thickness at a plurality of depths in the cased wellbore;
    generating at least one apparent density log based on the generated energy spectrum;
    determining at least one quality indicator;
    generating a compensated density log based on the apparent density log, the casing thickness at a plurality of depths, and the at least one quality indicator, whereby error is removed from the apparent density log to generate the compensated density log;
    validating the compensated density log based on the at least one quality indicator; and
    generating at least one photoelectric log based on at least one of the quality indicators comprising cement thickness.

2. The method of claim 1, wherein the step of determining at least one quality indicator comprises detecting casing collars and wherein the step of generating a compensated density comprises generating a compensated density log based on the apparent density log and the detected casing collars.

3. The method of claim 2, wherein the step of detecting comprises identifying casing spikes on the apparent density log.

4. The method of claim 3, further comprising selectively removing data corresponding to the identified casing spikes.

5. The method of claim 4, further comprising interpolating remaining data adjacent the removed data.

6. The method of claim 1, wherein the step of determining comprises determining a cement thickness and wherein the step of validating comprises validating the compensated density log with the cement thickness.

7. The method of claim 6, wherein the step of determining a cement thickness comprises determining a photoelectric effect.

8. The method of claim 6, wherein the step of determining a cement thickness comprises determining an apparent density.

9. The method of claim 1, wherein the step of determining comprises determining an estimated error and wherein the step of validating comprises validating the compensated density log with the estimated error.

10. The method of claim 9, wherein the estimated error is based on one of casing error, cement error, logging speed and combinations thereof.

\* \* \* \* \*